United States Patent
Koito et al.

(10) Patent No.: US 9,046,717 B2
(45) Date of Patent: Jun. 2, 2015

(54) OPTICAL DEVICE, DISPLAY DEVICE, ELECTRONIC APPARATUS, MANUFACTURING DEVICE AND MANUFACTURING METHOD

(71) Applicant: Japan Display West Inc., Aichi-Ken (JP)

(72) Inventors: Takeo Koito, Kanagawa (JP); Daisuke Takama, Kanagawa (JP)

(73) Assignee: Japan Display Inc., Tokyo (JP)

( * ) Notice: Subject to any disclaimer, the term of this patent is extended or adjusted under 35 U.S.C. 154(b) by 181 days.

(21) Appl. No.: 13/754,547

(22) Filed: Jan. 30, 2013

(65) Prior Publication Data

US 2013/0222753 A1 Aug. 29, 2013

(30) Foreign Application Priority Data

Feb. 24, 2012 (JP) .................................. 2012-038433

(51) Int. Cl.
*G02F 1/1339* (2006.01)
*G02F 1/1335* (2006.01)

(52) U.S. Cl.
CPC .......... *G02F 1/1339* (2013.01); *G02F 1/13392* (2013.01)

(58) Field of Classification Search
CPC ... G02F 1/1339; G02F 1/1341; G02F 1/1345; G02F 1/13415; G02F 1/133526; G02F 1/133621; G02F 1/133512; G02B 27/2214; G02B 27/26; H04N 13/0404

USPC .................................. 349/95, 15, 153, 190
See application file for complete search history.

(56) References Cited

U.S. PATENT DOCUMENTS

| | | | |
|---|---|---|---|
| 6,636,192 B1 * | 10/2003 | Saitoh | 345/87 |
| 8,823,917 B2 * | 9/2014 | Lee et al. | 349/200 |
| 2011/0157498 A1 * | 6/2011 | Kim et al. | 349/15 |
| 2013/0100365 A1 * | 4/2013 | Komura et al. | 349/15 |

FOREIGN PATENT DOCUMENTS

| | | |
|---|---|---|
| JP | 2001-305569 A | 10/2001 |
| JP | 2001-330837 A | 11/2001 |
| JP | 2002-040442 A | 2/2002 |
| JP | 2010-139953 | 6/2010 |
| JP | 2010-224491 | 10/2010 |
| JP | 2011-154197 A | 8/2011 |

OTHER PUBLICATIONS

Japanese Office Action mailed Mar. 24, 2015 for corresponding Japanese Application No. 2012-038433.

* cited by examiner

*Primary Examiner* — Mike Qi
(74) *Attorney, Agent, or Firm* — Fishman Stewart Yamaguchi PLLC

(57) ABSTRACT

An optical device includes: at least two protrusions on a first substrate; a sealing material filled between the two protrusions; a second substrate attached so as to face and touch the first substrate through the sealing material; and a liquid crystal material injected between the first substrate and second substrate.

17 Claims, 19 Drawing Sheets

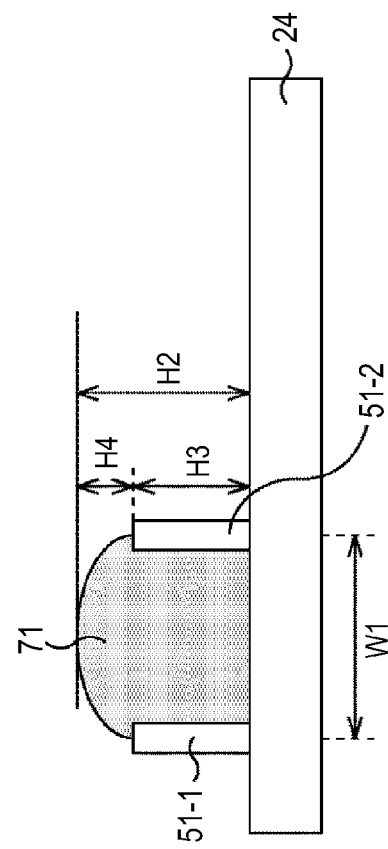
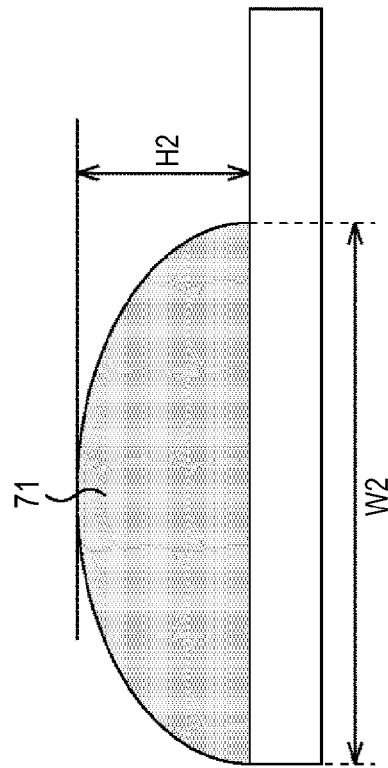

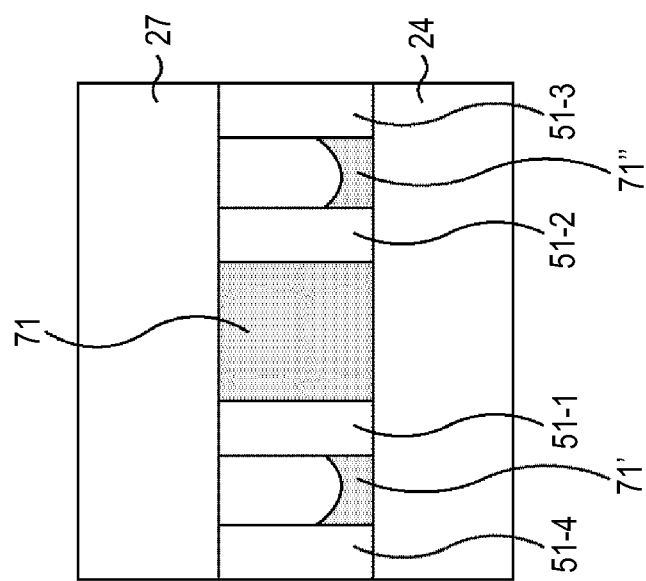
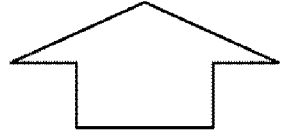
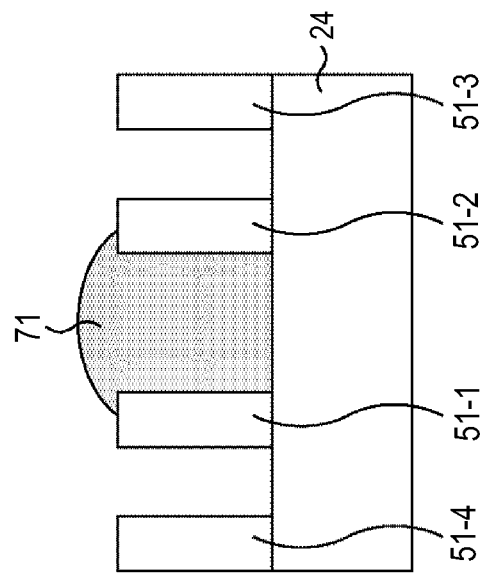

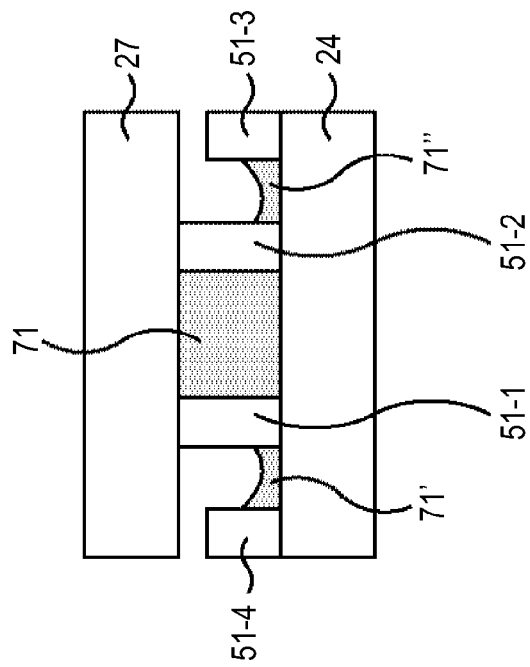
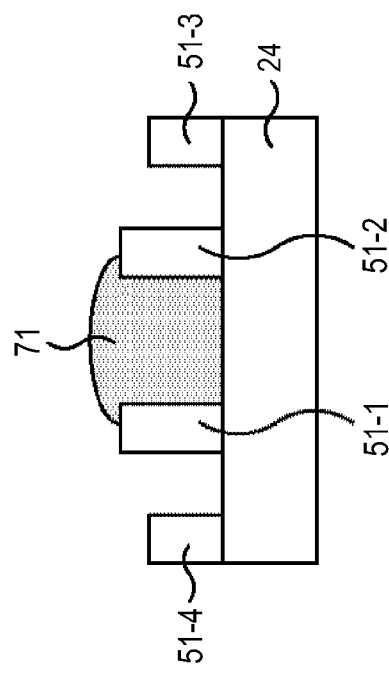

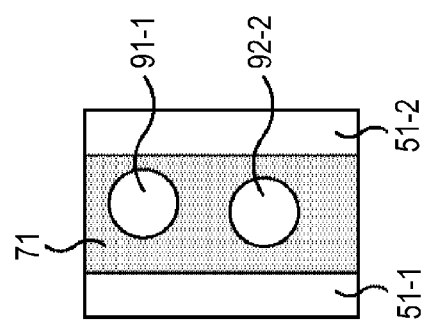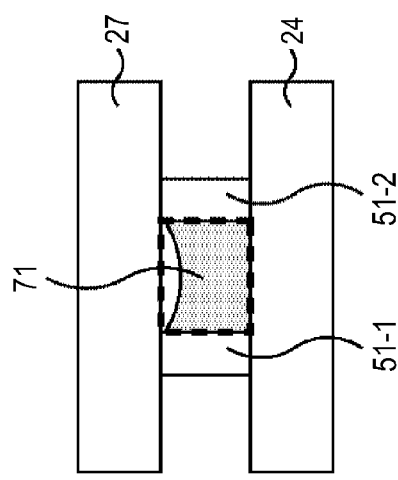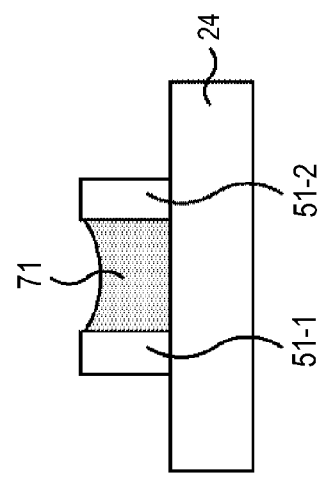

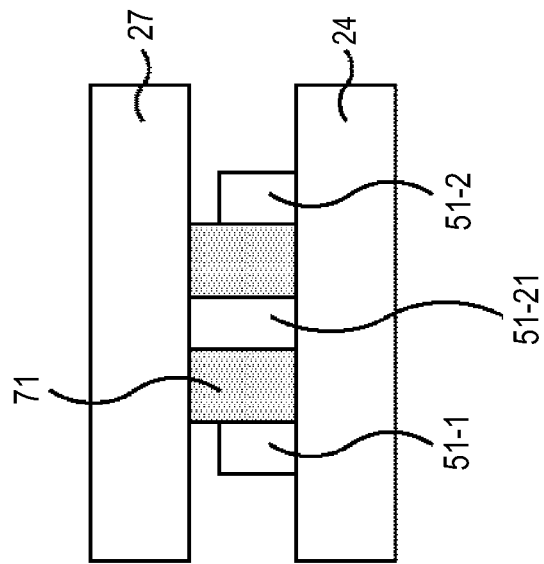
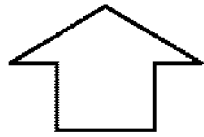
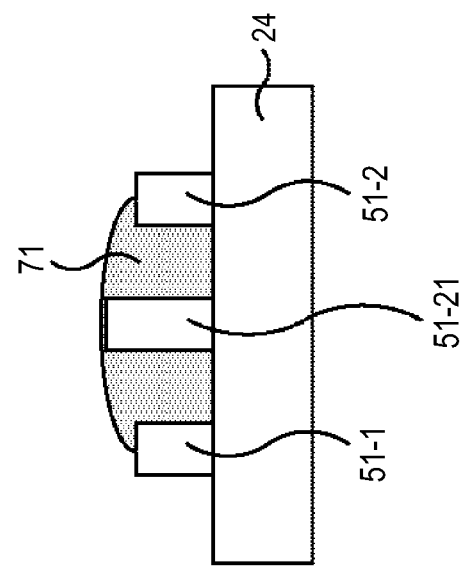

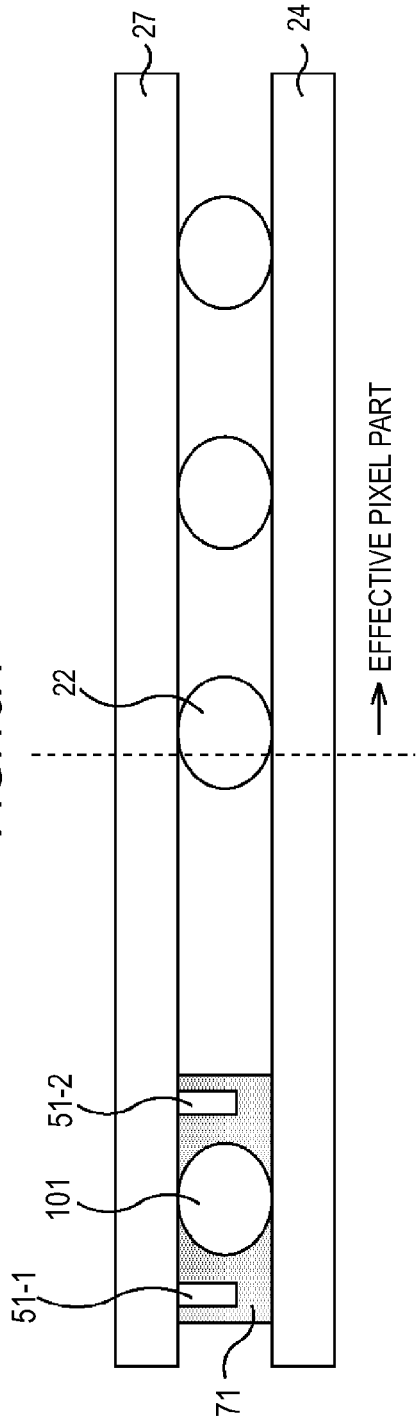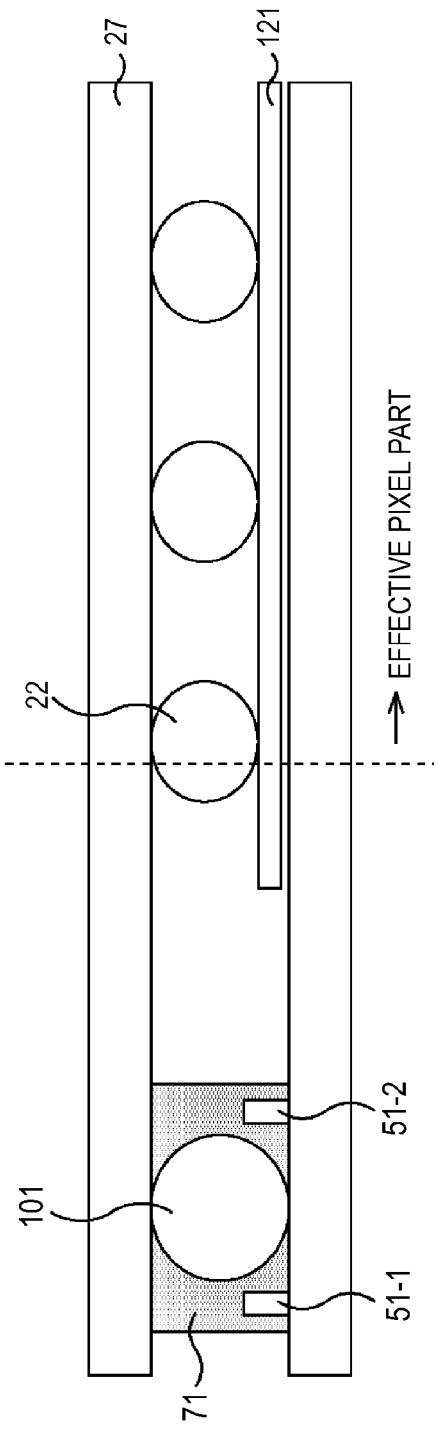

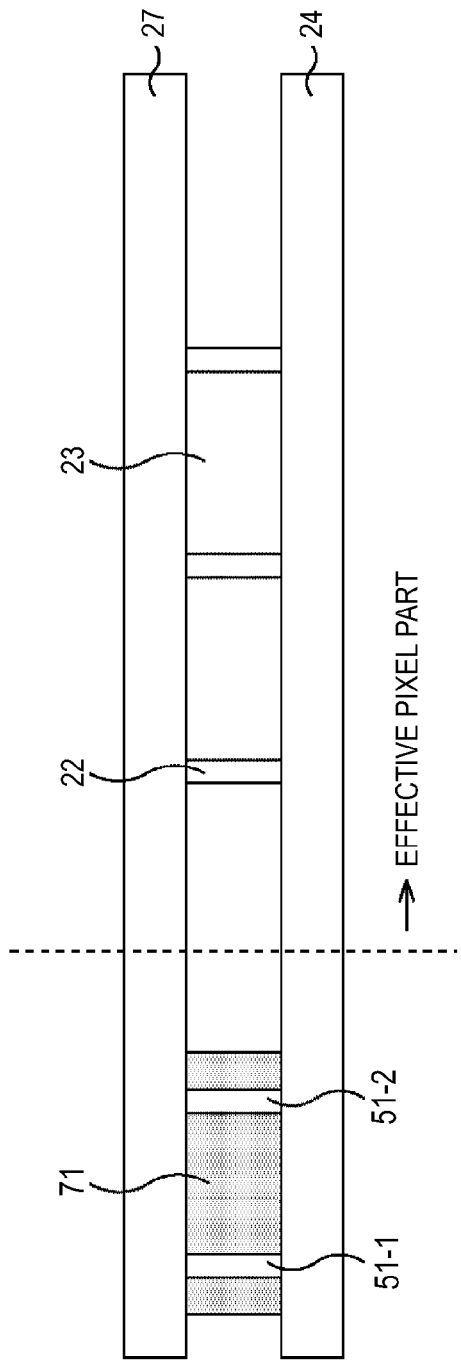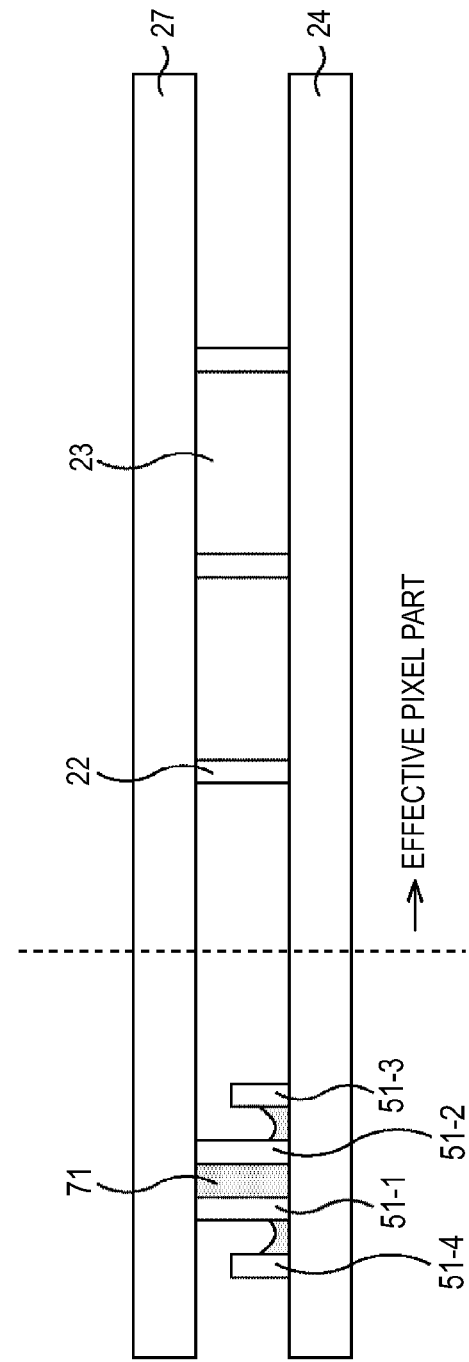

OPTICAL DEVICE, DISPLAY DEVICE, ELECTRONIC APPARATUS, MANUFACTURING DEVICE AND MANUFACTURING METHOD

FIELD

The present disclosure relates to an optical device, a display device, an electronic apparatus, a manufacturing device and a manufacturing method. Particularly, the present disclosure relates to an optical device, a display device, an electronic apparatus, a manufacturing device and a manufacturing method capable of reducing the width a seal part of a liquid crystal lens and so on.

BACKGROUND

A liquid crystal display device is used in various fields of applications as the device can be thin in thickness. In the liquid crystal display device, a TFT substrate on which pixel electrodes and thin-film transistors (TFTs) and the like are formed in a matrix state and a color filter substrate on which color filters and the like are formed at positions corresponding to the pixel electrodes face each other, and liquid crystal is sandwiched between the TFT substrate and the color filter substrate. Light transmittance corresponding to liquid crystal materials is controlled in units of pixels to thereby form an image.

In the TFT substrate, there are data lines extending in the vertical direction and arranged in the horizontal direction and scanning lines extending in the horizontal direction and arranged in the vertical direction, and pixels are arranged in an area surrounded by the data lines and scanning lines. Each pixel chiefly includes the pixel electrode and the thin-film transistor (TFT) as a switching device. A display area is formed by many pixels formed in the matrix state in the above manner.

The TFT substrate and the counter substrate are bonded together through a sealing material. In this case, a gap between the TFT substrate and the counter substrate is prescribed through columnar spacers formed in the counter substrate in the display area, thereby allowing a liquid crystal layer to be a given thickness. In the seal part, glass fibers are mixed into the sealing material, and the thickness of the seal part is prescribed by a diameter of glass fibers.

However, when a manner of determining the gap between the TFT substrate and the counter substrate differs in the display area and in the seal part, reliability of the seal part may be reduced as well as display unevenness may occur due to nonuniformity of the gap. Accordingly, there is proposed that, in JP-A-2010-139953 (Patent Document 1), the gap between the TFT substrate and the counter substrate in the display area and the seal part is made to be constant as well as reliability of the seal part is increased. It is also proposed that, in JP-A-2010-224491 (Patent Document 2), protrusions are provided to thereby prevent the spread of the seal.

SUMMARY

A cell gap is approximately 2 to 4 μm in the liquid crystal display device. For example, in a liquid crystal cell to be applied for a display such as a cellular phone device, the order of the cell gap is approximately 3 μm. However, in the case of applications such as a liquid crystal lens and polymer dispersed liquid crystal, a large cell gap of 10 μm or more is necessary. In the case where such large cell gap is necessary, the seal surrounding the liquid crystal have to be thick for maintaining the size (height) equivalent to the cell gap. Accordingly, it is difficult to narrow the width of a portion of a frame in which the seal is provided.

A large screen is requested in the display area also in mobile devices and the like, however, it is desirable that the portion of the frame provided around the display area is narrowed in width in the light of design and so on. When the frame portion is narrowed in width, it is possible to increase the number of devices obtained from a mother substrate as well as to reduce the costs. It is desirable to narrow the width of the frame portion also from the above point of view, however, it is difficult to narrow the width of the frame portion as the thickness of the seal is increased.

In Patent Document 1, there is proposed the technique in which the columnar spacers are provided in the seal to fix the gap between the TFT substrate and the counter substrate in the display area and the seal part to be constant. However, it is necessary to uniform the height of spacers, thus, it is necessary to manufacture the device with high accuracy to realize the above, which may increase the costs.

In Patent Document 2, there is proposed a technique in which protrusions are provided to thereby prevent the spread of the seal. According to the structure, as the height of the seal depends on the line width, the thickness of the sealing may be increased.

In view of the above, it is desirable to respond to the necessity of a large cell gap without increasing the thickness of the sealing.

An embodiment of the present disclosure is directed to an optical device including at least two protrusions on a first substrate, a sealing material filled between the two protrusions, a second substrate attached so as to face and touch the first substrate through the sealing material, and a liquid crystal material injected between the first substrate and second substrate.

The protrusions may be provided for controlling an interface of the sealing material and provided for allowing the sealing material to secure a height between the first substrate and the second substrate.

The optical device may further include a protrusion for stopping the sealing material which is run off from the protrusion formed outside at least any one of the two protrusions.

The protrusion for stopping the sealing material may be provided to be lower in height than the two protrusions.

The two protrusions may have a height necessary for a gap between the first substrate and the second substrate.

The optical device may further include a protrusion having the height necessary for the gap between the first substrate and the second substrate.

Dispersed spacers may be included in the liquid crystal material.

Silica beads may be included in the sealing material, and the silica beads or the dispersed spacers may be included in the liquid crystal material.

Spacers provided between the first substrate and the second substrate in a portion where the liquid crystal material is injected and the protrusions may be made of the same material.

In the optical device according to another embodiment of the present disclosure, at least two protrusions are provided on the first substrate, the sealing material is filled between the two protrusions, the second substrate is attached so as to face and touch the first substrate through the sealing material and the liquid crystal material is injected between the first substrate and second substrate.

Still another embodiment of the present disclosure is directed to a display device including a display part performing image display, and a lens part arranged so as to face a display surface of the display part, selectively changing a transmission state of light rays from the display part, in which the lens part has at least two protrusions on a first substrate, a sealing material filled between the two protrusions, a second substrate attached so as to face and touch the first substrate through the sealing material, and a liquid crystal material injected between the first substrate and second substrate.

Yet another embodiment of the present disclosure is directed to an electronic apparatus including a display part performing image display, and a lens part arranged so as to face a display surface of the display part, selectively changing a transmission state of light rays from the display part, in which the lens part has at least two protrusions on a first substrate, and a sealing material filled between the two protrusions, second substrate attached so as to face and touch the first substrate through the sealing material, and a liquid crystal material injected between the first substrate and second substrate.

In the display device and the electronic apparatus according to the embodiments of the present disclosure, the display part performing image display, and the lens part arranged so as to face the display surface of the display part, selectively changing the transmission state of light rays from the display part are included. The lens part includes at least two protrusions on a first substrate, and a sealing material filled between the two protrusions, second substrate attached so as to face and touch the first substrate through the sealing material, and a liquid crystal material injected between the first substrate and second substrate.

Still yet another embodiment of the present disclosure is directed to a manufacturing device of a liquid crystal lens panel having a liquid crystal material by the processing including forming two protrusions on a first substrate, filling a sealing material between the two protrusions, stacking the second substrate so as to face and touch the first substrate through the sealing material, and injecting the liquid crystal material between the stacked first substrate and the second substrate.

The protrusions may be formed so as to control an interface of the sealing material and to allow the sealing material to secure a height between the first substrate and the second substrate.

The processing may further include forming a protrusion for stopping the sealing material which is run off from the protrusion outside any one of the two protrusions.

The processing may further include dispersing dispersed spacers on the first substrate.

Spacers provided between the first substrate and the second substrate in a portion where the liquid crystal material is injected and the protrusions may be made of the same material and the spacers and the protrusions may be formed on the first substrate in the same process.

Further another embodiment of the present disclosure is directed to a manufacturing method of a liquid crystal lens panel having a liquid crystal material, including forming at least two protrusions on a first substrate, filling a sealing material between the two protrusions, attaching the second substrate so as to face and touch the first substrate through the sealing material, and injecting the liquid crystal material between the first substrate and the second substrate.

In the manufacturing device and the manufacturing method according to the embodiments of the present disclosure, the liquid crystal lens panel including the liquid crystal material is manufactured by including the processes of forming at least two protrusions on the first substrate, filling the sealing material between the two protrusions, attaching the second substrate so as to face and touch the first substrate through the sealing material, and injecting the liquid crystal material between the first substrate and the second substrate.

According to the embodiments of the present disclosure, it is possible to form a liquid crystal lens and so on without increasing the width of the seal even when a large cell gap is necessary.

BRIEF DESCRIPTION OF THE DRAWINGS

FIGS. 5A and 5B are views for explaining protrusions;
FIGS. 8A and 8B are views for explaining protrusions;
FIGS. 9A and 9B are views for explaining protrusions;
FIGS. 10A to 10C are views for explaining protrusions;
FIGS. 12A and 12B are views for explaining protrusions;
FIGS. 18A and 18B are views for explaining protrusions;
FIGS. 19A and 19B are views for explaining protrusions.

DETAILED DESCRIPTION

Hereinafter, an embodiment of the present disclosure will be explained with reference to the drawings.
[Structure of Liquid Crystal Lens]
As the present disclosure explained below can be applied to a liquid crystal lens, the present disclosure will be explained by citing the liquid crystal lens as an example. First, the liquid crystal lens will be explained. The liquid crystal lens is used, for example, when realizing stereoscopic vision by allowing an observer to see parallax images having parallax in right and left eyes of the observer without the necessity of dedicated glasses.

The method in which dedicated glasses are not necessary is assumed to be applied to not only a television receiver but also, for example, displays for portable electronic apparatuses such as a smart phone, a cellular phone device, a portable game machine and a Netbook computer.

As a specific method of realizing the method in which dedicated glasses are not necessary, there is one in which an optical device for 3D display which polarizes display image light emitted from a 2D display device in plural viewing angle directions is combined on a screen of the 2D display device such as a liquid crystal display.

A switching-type lens array device including liquid crystal lenses is known. The liquid crystal lens array device can electrically switch between with or without lens effect. Therefore, it is possible to switch between two modes which are a 2D display mode in a state without the lens effect and a 3D display mode in a state with the lens effect by providing the liquid crystal lens array device on the screen of the 2D display device.

Figure 1:
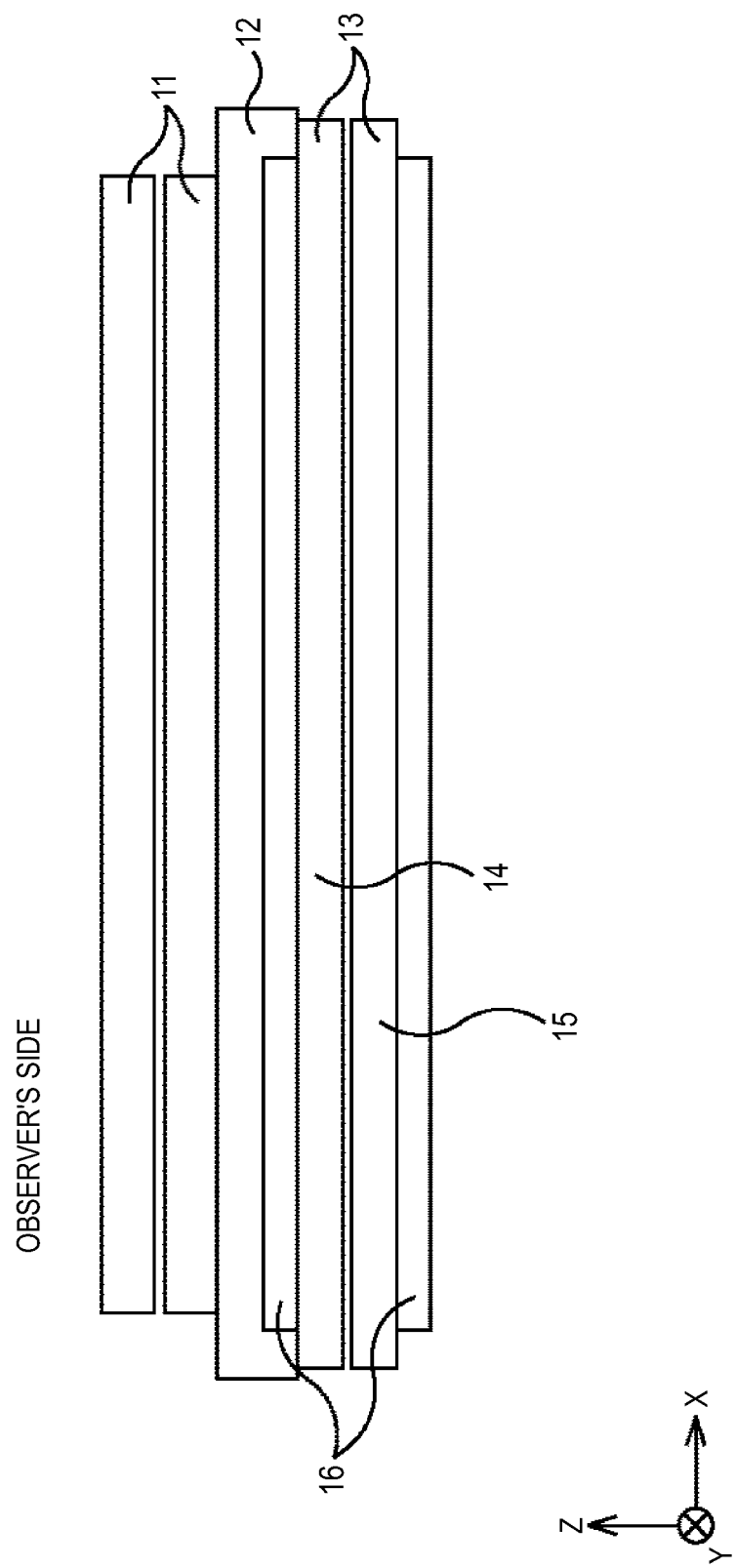
FIG. 1 is a view showing a structure of a display device including a liquid crystal lens panel.

A schematic view of the liquid crystal lens arranged on the liquid crystal display is shown in FIG. 1. A liquid crystal lens panel 11 shown in FIG. 1 is stacked over an LCD (Liquid Crystal Display) 13 through a photoelastic body 12. Here, the explanation will be continued by citing the LCD as an example of the display device, however, display devices such as an organic EL (Electro-Luminescence) panel can be used.

The LCD 13 has a structure in which an oily transparent liquid crystal component (liquid crystal material) is sandwiched by two transparent substrates and a periphery of the substrates is sealed by a sealing material to thereby prevent the liquid crystal material from being leaked, though the detailed structure is not shown. As the two substrates, a color filter substrate (a counter substrate 14) is arranged on the front side and an array substrate 15 is arranged on the reverse side. In the array substrate 15, active devices such as TFTs and electrodes to be sub-pixels are fabricated on the side facing the liquid crystal in an array state.

In the LCD 13, a pair of polarizing plates (polarizing filters) 16 are provided further outside the transparent substrates on the front and the back between which liquid crystal is sealed. In the case of a transmissive LCD 13, light emitted from a not-shown light source (backlight) on the back side is transmitted through respective components in the following order.

the light source→the polarizing plate 16→the array substrate 15→the transparent electrode of sub-pixels→an alignment film→the liquid crystal→an alignment layer→a common transparent electrode→the counter substrate 14 (color filter substrate)→the polarizing plate 16

As the liquid crystal lens panel 11 is further stacked over the LCD 13 having the above structure through the photoelastic body 12, light reaches the liquid crystal panel 11 from the polarizing plate 16 through the photoelastic body 12. Then, light transmitted through the liquid crystal lens panel 11 reaches eyes of the observer. The display device including the liquid crystal lens panel 11 having the above structure is used for naked-eye 3D display.

Though the liquid crystal lens panel 11 is arranged on the upper side of the LCD 13 (observer's side) in FIG. 1, the liquid crystal lens panel 11 can be arranged on the lower side of the LCD 13 (opposite side to the observer's side). When the liquid crystal lens panel 11 is arranged on the lower side of the LCD 13, it is possible to form, for example, a high-luminance panel by controlling the viewing angle of the display device and by collecting light at light shielding portions such as wiring.

In the liquid crystal lens panel 11 described above, it is requested that an outside dimension is smaller than the panel to be stacked due to the tolerance in bonding and for control of the photoelastic body, and thus a narrow frame is requested. Therefore, it is necessary to reduce the width of a seal part of the liquid crystal lens panel 11.

[Structure Example of Liquid Crystal Lens Panel 11]

Figure 2:
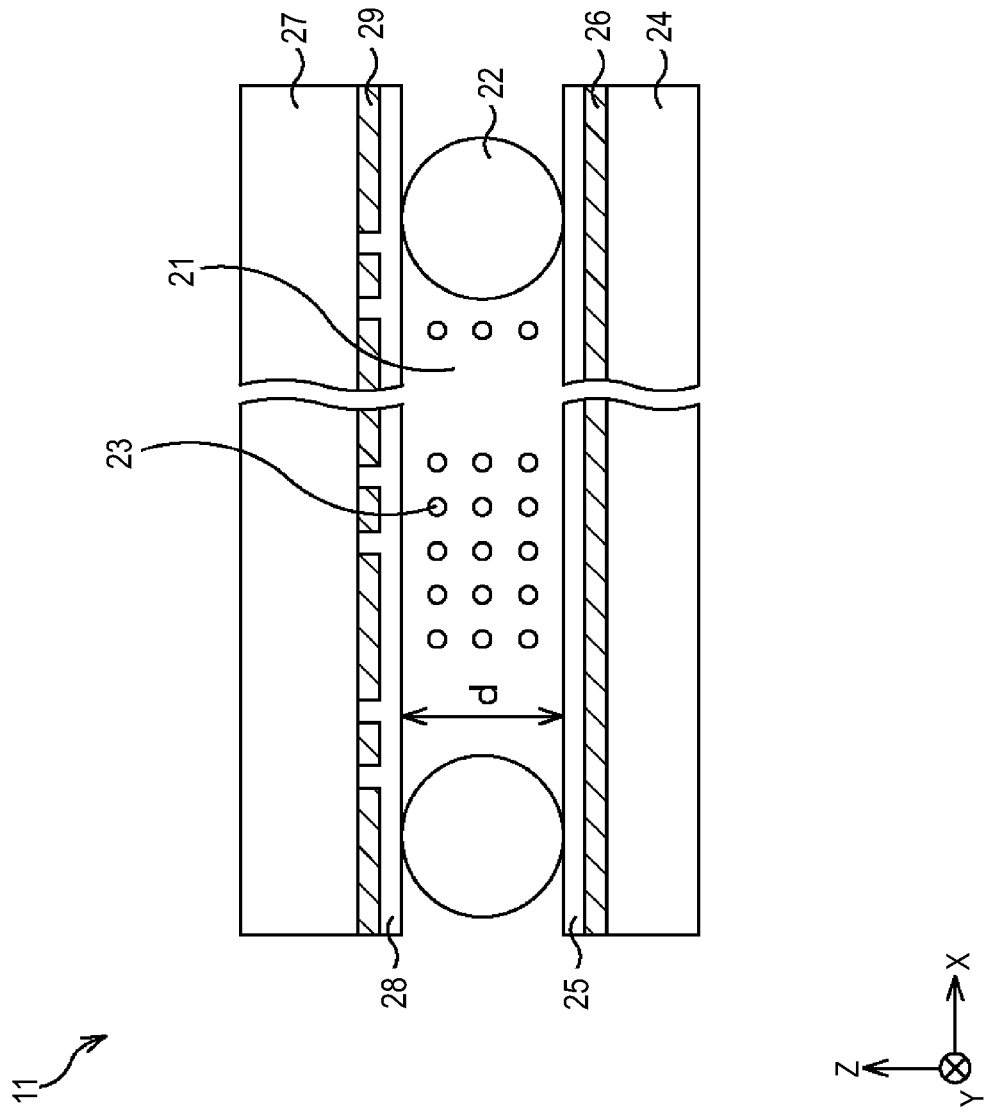
FIG. 2 is a view showing a structure of the liquid crystal lens panel.

FIG. 2 shows a cross-sectional view of the liquid crystal lens panel 11. The liquid crystal lens panel 11 selectively changes a transmission state of light rays from the LCD 13 by controlling the lens effect of respective areas on the screen in accordance with the display mode. As the structure of the liquid crystal lens panel 11 shown in FIG. 2 is an example, the structure, materials and so on can be appropriately changed. Different structures and materials will be appropriately explained with reference to the drawings other than FIG. 2.

First, the structure of one example of the liquid crystal lens panel 11 will be explained with reference to FIG. 2.

The liquid crystal lens panel 11 includes a first substrate 24 and a second substrate 27 arranged so as to face each other with a gap "d" as well as a liquid crystal layer 21 arranged between these substrates. On alignment films 25 and 28, spacers 22 made of a glass material or a resin material are arranged for maintaining the gap "d" between the first substrate 24 and the second substrate 27 to be uniform. The first substrate 24 and the second substrate 27 are transparent substrates also made of, for example, the glass material, the resin material and so on.

Though the structure in which the spacers 22 shown in FIG. 2 are provided is cited as the example, the structure without the spacers 22 can be applied. As a height direction (the gap "d") can be controlled by protrusions 51 provided in the seal part of the liquid crystal lens panel 11 as described later, it is possible to apply the structure in which the gap "d" of the liquid crystal lens panel 11 is secured by the protrusions 51 and the spacers 22 are not provided inside the liquid crystal layer 21.

In the case where the spacers 22 are provided inside the liquid crystal layer 21, the spacers 22 made of the glass material or the resin material as described above can be dispersed (dispersed spacers). It is also possible to form the spacer in a wall state or a columnar state in the same manner as the protrusions 51 to be formed as a photospacer.

A first electrode group 26 is formed on the first substrate 24 on the side facing the second substrate 27, in which plural transparent electrodes extending in a first direction (an X-axis direction in the drawing) are arranged in parallel at intervals in a width direction (a Y-axis direction in the drawing). Also on the first substrate 24, the alignment film 25 is formed through the first electrode group 26.

Similarly, a second electrode group 29 is formed on the second substrate 27 on the side facing the first substrate 24, in which plural transparent electrodes extending in a second direction (the Y-axis direction in the drawing) which is different from the first direction are arranged in parallel at intervals in a width direction (the X-axis direction in the drawing). Also on the second substrate 27, the alignment film 28 is formed through the second electrode group 29.

The liquid crystal layer 21 includes a liquid crystal material 23, and an alignment direction of the liquid crystal material 23 is changed in accordance with a voltage applied to the first electrode group 26 and the second electrode group 29 to thereby control the lens effect. The liquid crystal material 23 has refractive-index anisotropy, having a structure of a refractive-index ellipsoid with different refractive indexes with respect to transmitting light rays, for example, in the longitudinal direction and in the lateral direction.

Though the example in which both the first electrode group 26 and the second electrode group 29 are patterned is cited here, it is also possible to apply a structure in which anyone of the first electrode group 26 and the second electrode group 29 is patterned.

For example, methods such as switching of the lens between vertical and horizontal directions may be used, or a structure in which one of the electrodes is configured as a plane electrode of the transparent electrode such as ITO (Indium Tin Oxide) which is not patterned (effective pixel part) may be applied in other applications.

When the above structure is applied, the plane electrode's side is arranged so as to face the observer's side in consideration of electrostatics and so on. On the other electrode group, transparent electrodes such as ITO are patterned. For example, the patterning is performed to be a structure in which lines and spaces are repeated in a given fixed direction. In the case of such stripe structure, refractive-index distribution is generated in an electric field between electrodes, which allows electrodes to function as the lens, in which electrodes extend in the vertical direction "y" with respect to the direction "X" of a cross-section of the lens. The present disclosure can be applied to the liquid crystal lens panel 11 having such structure.

[Height of Seal]

Figure 3:
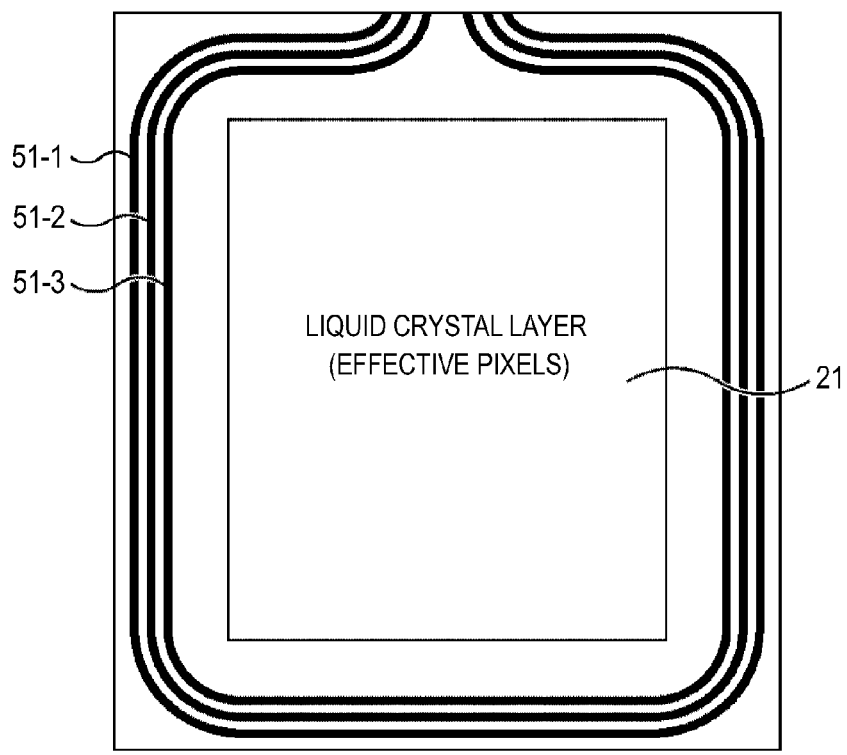
FIG. 3 is a view showing a structure of the liquid crystal lens panel according to an embodiment of the present disclosure.

The liquid crystal lens panel 11 and the LCD 13 have commonality in a point that both have the structure in which liquid crystal is sandwiched between a pair of substrates. The pair of substrates is bonded through a sealing material formed around the liquid crystal portion. For example, when seeing the liquid crystal lens panel 11 from the above (observer's side) as shown in FIG. 3, the liquid crystal layer 21 including the liquid crystal lens is arranged in a central portion and the periphery thereof is sealed by the sealing material to thereby prevent the liquid crystal material from being leaked. The sealing is formed in a corresponding position in the liquid crystal lens panel 11 so as to surround effective pixels of the LCD 13.

In the embodiment, the sealing material is filled between a protrusion 51-1 and a protrusion 51-2 provided on the first substrate 24 or the second substrate 27 to bond the first substrate 24 and the second substrate 27 together. Though the expression in which the sealing material is filled between the protrusion 51-1 and the protrusion 51-2 is used here, this state means that the sealing material exists inside the space including the protrusion 51-1 and the protrusion 51-2 without any gap. The sealing material is printed or coated by a dispenser and so on as described later.

A protrusion 51-3 shown in FIG. 3 is provided for preventing the sealing material from flowing out to the liquid crystal layer 21. In the case where it is not necessary to individually distinguish the protrusions 51-1 to 51-3, the protrusions will be represented merely as protrusions 51. The detailed explanation of the protrusions 51 will be described later.

The LCD 13 has also the liquid crystal material forming the effective pixels in the central portion and the periphery thereof is sealed by the sealing material to thereby prevent the liquid crystal material from being leaked in the same manner as the liquid crystal lens panel 11, though not shown.

In both the liquid crystal lens panel 11 and the LCD 13, the sealing material is disposed around the liquid crystal material to prevent the liquid crystal material from being leaked as well as to bond the upper and lower substrates together. The upper and lower substrates are bonded together by using surface tension of the sealing material. The height generated by the surface tension of the sealing material covers the gap (cell gap) between upper and lower substrates.

Figure 4A:
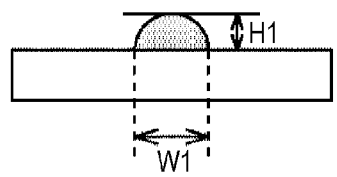
FIGS. 4A and 4B are views for explaining the surface tension.
Figure 4B:
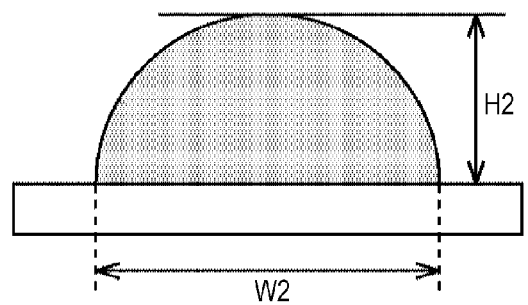

The surface tension of the sealing material will be explained with reference to FIGS. 4A and 4B. FIG. 4A shows a state in which the height of the sealing material is not always necessary and FIG. 4B shows a state in which the height of the sealing material is necessary. The height of the sealing material shown in FIG. 4A is a height H1 and the line width is a width W1. The height of the sealing material shown in FIG. 4B is a height H2 and the line width is a width W2. The height H2 is higher than the height H1 and the width W2 is wider than the width W1. It is found from the above that the width is necessary for securing the height of the sealing material. That is, it is clear that the height depends on the surface tension, and the line width is necessary for increasing the height.

The cell gap in the LCD 13 is approximately 2 to 4 μm, and is approximately 3 μm in a liquid crystal cell to be applied to the display for the cellular phone device and so on. On the other hand, 10 μm or more is necessary for the cell gap in the liquid crystal panel 11. When the state shown in FIG. 4A is LCD 13, the height H1 will be approximately 3 μm. When the state shown in FIG. 4B is the liquid crystal panel 11, the height H2 will be approximately 10 μm.

Accordingly, concerning the line width of the sealing material used for the periphery of the LCD 13, the width W1 is enough, however, concerning the line width of the sealing material used for the periphery of the liquid crystal lens panel 11, the width W2 is necessary. However, it is requested that the outside dimension is smaller than the panel to be stacked due to the tolerance in bonding and for control of the photo-elastic body, and thus a narrow frame is requested, therefore, it is necessary to reduce the line width of the sealing material. Accordingly, it is requested that the line width of the sealing material of the liquid crystal lens panel 11 is also equivalent to the line width of the sealing material of the LCD 13 or further smaller than the case of the LCD 13.

In response to the above, the protrusions 51 are provided as shown in FIG. 3 for obtaining the necessary height and reducing the line width. FIG. 5A shows the case shown in FIG. 4B, representing that the width W2 is necessary as the line width when the height H2 is necessary as the height of the sealing material. On the other hand, the height is the height H2 but the line width is the width W1 in FIG. 5B, which is the same as, for example, the width W1 of the line width of the LCD 13 shown in FIG. 4A.

Referring to FIG. 5B, the protrusion 51-1 and the protrusion 51-2 are provided on the first substrate 24. A sealing material 71 is filled between the protrusion 51-1 and the protrusion 51-2. The protrusion 51 is formed to have a height slightly lower than the height H2. The height of the protrusion 51 is set to a height H3. In this case, the height H3 is lower than the height H2.

As shown in FIG. 5B, the sealing material 71 filled between the protrusions 51 becomes higher by a height H4 at a portion above the height H3 due to the surface tension. Accordingly, the height of the sealing material 71 from the first substrate 24 will be the height obtained by adding the height H3 to the height H4.

When (height H3+height H4) is equivalent to the height H2, the height H2 is secured. In other words, the height H3 of the protrusions 51 is set in consideration of the height H2 obtained by the surface tension of the sealing material 71 so that the total height is higher than the height H2, thereby obtaining the necessary height H2 from the first substrate 24 of the sealing material 71.

Figure 6A:
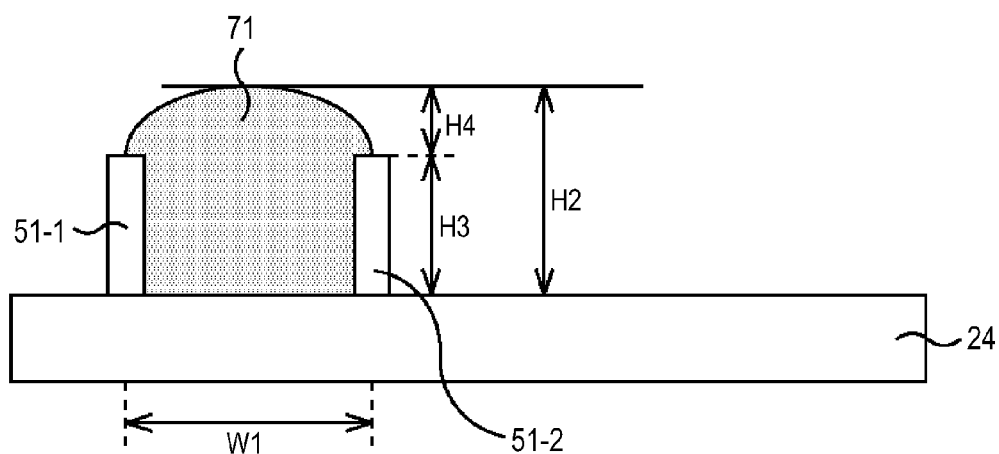
FIGS. 6A and 6B are views for explaining protrusions.
Figure 6B:
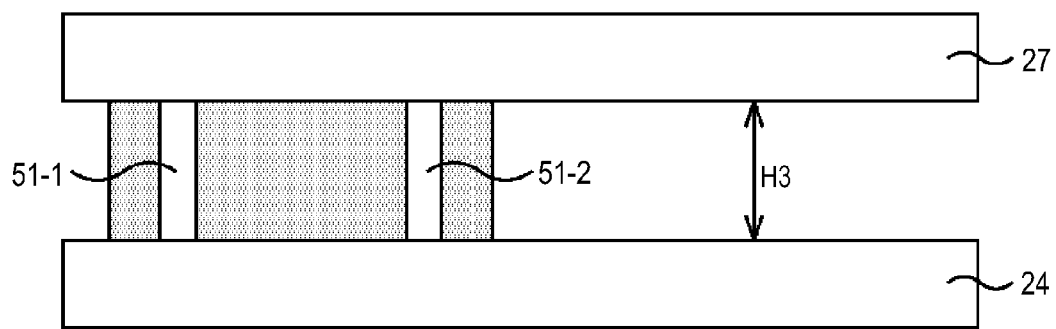

The height H3 of the protrusions 51 is determined in consideration of a state shown in FIGS. 6A and 6B. FIG. 6A is the state shown in FIG. 5B. As shown in FIG. 6A, when the second substrate 27 comes close to the first substrate 24 from an upper direction in a state in which the protrusions 51-1 and 51-2 are provided on the first substrate 24 and the sealing material 71 is filled between the protrusions, a tip of the sealing material 71 touches the second substrate 27 as the sealing material 71 is higher than the protrusions 51 by the height H4 obtained due to the surface tension. When the second substrate 27 is further superimposed onto the first substrate 24, the first substrate 24 and the second substrate 27 are bonded together with a gap corresponding to the height H3 of the protrusions 51 as shown in FIG. 6B.

As shown in FIG. 6B, the first substrate 24 and the second substrate 27 are superimposed with a gap corresponding to the height H3 of the protrusions 51. Accordingly, the cell gap of the liquid crystal lens panel 11 can be secured by setting the height H3 of the protrusions 51 as the cell gap of the liquid crystal panel 11. The height of the protrusions 51 can be set in this manner.

To secure the cell gap by the protrusions 51 will be described later, however, it does not necessarily mean that the height of the protrusions 51 is set to be equivalent to the cell gap. When the height H3 of the protrusions 51 is set to be equivalent to the cell gap, the height H3 will be the gap "d" in FIG. 2.

Figure 7A:
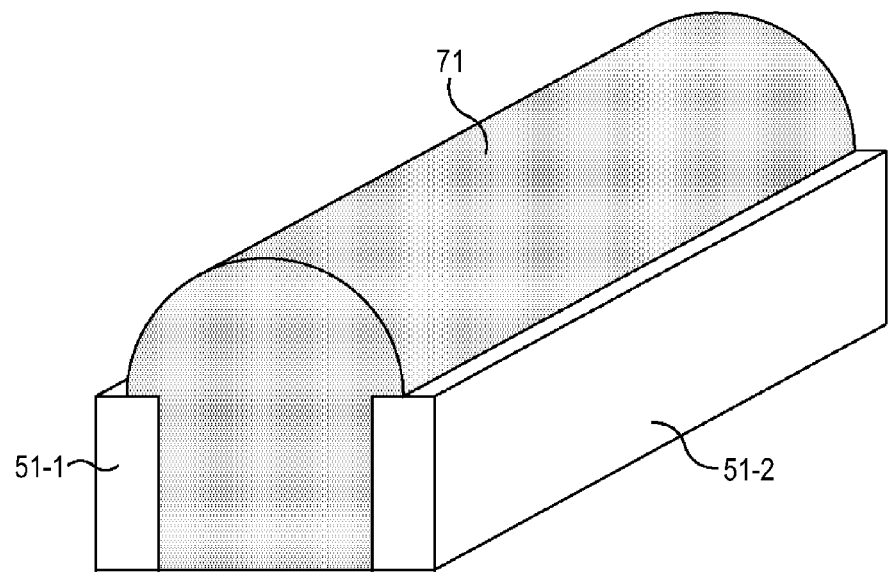
FIGS. 7A and 7B are views for explaining protrusions.
Figure 7B:
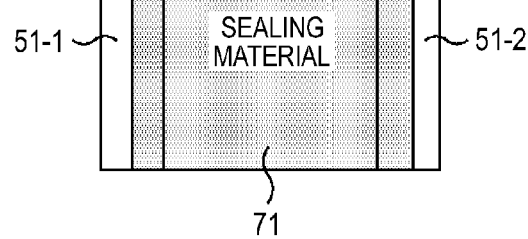

FIGS. 7A and 7B is a view of the protrusions 51 and the sealing material 71 seen from another angle. As shown in FIG. 7A, the protrusions 51-1 and the protrusions 51-2 have a shape which is long in an extending direction of the sealing material 71, and the height of the protrusions is set depending on the cell gap as described above. As shown in FIG. 7B, the sealing material 71 is filled between the protrusions 51-1 and the protrusions 51-2 when seen from the above.

Interface edges of the sealing material 71 are positioned in a state of touching upper surfaces of the protrusions 51-1 and the protrusions 51-2. As shown in FIG. 7A, the sealing material 71 keeps a stable state, not being spilled out, at a position higher than the protrusions 51 due to the surface tension. However, in the state in which the first substrate 24 and the second substrate 27 are bonded together, the height of the sealing material 71 is lower than the state before the first substrate 24 and the second substrate 27 are bonded together (state shown in FIG. 7A) by the height 1-14 obtained due to the surface tension as explained with reference to FIG. 6B.

Accordingly, the sealing material 71 at a portion of the height 1-13 of the sealing material 71 may be run off to the outside of the protrusions 51 as shown in FIG. 6B. Referring to FIG. 6B again, a surplus sealing material 71 which is run off exists on the left side of the protrusion 51-1 in the drawing and a surplus sealing material 71 which is run off exists on the right side of the protrusion 51-2 in the drawing. If the surplus sealing material 71 which is run off is spilled out to the liquid crystal layer 21 of the liquid crystal lens panel 11, the performance as the lens may be deteriorated, therefore, it is necessary to prevent the situation.

In response to the above, it can be considered that the number of protrusions 51 is increased as shown in FIGS. 8A and 8B. As shown in FIG. 8A, four protrusions 51 are provided on the first substrate 24. The protrusion 51-1 and the protrusion 51-2 are provided for securing the height of the sealing material 71. A protrusion 51-4 provided on the left side of the protrusion 51-1 in the drawing and a protrusion 51-3 provided on the right side of the protrusion 51-2 are provided for stopping the sealing material 71 which is run off.

As described above, the protrusions 51-1 and 51-2 for securing the height of the sealing material 71 and the protrusions 51-3 and 51-4 for stopping the sealing material 71 which is run off are provided, thereby preventing the surplus sealing material 71 from flowing out to the liquid crystal layer 21.

Referring to FIG. 8B, when the first substrate 24 and the second substrate 27 are superimposed, first, the sealing material 71 is filled between the protrusion 51-1 and the protrusion 51-2. Then, a surplus sealing material 71' climbing over and run off from the protrusion 51-1 is controlled to stay between the protrusion 51-1 and the protrusion 51-4 so as not to be further run off from the protrusion 51-4. Similarly, a surplus sealing material 71" climbing over and run off from the protrusion 51-2 is controlled to stay between the protrusion 51-2 and the protrusion 51-3 so as not to be further run off from the protrusion 51-3.

An amount of the surplus sealing material 71 to be run off is smaller than an amount of the sealing material 71 which is originally necessary (the sealing material 71 filled between the protrusion 51-1 and the protrusion 51-2). Accordingly, there exists the surplus sealing material 71' between the protrusion 51-1 and the protrusion 51-4, and the amount thereof is smaller than the amount of the sealing material 71 filled between the protrusion 51-1 and the protrusion 51-2. Similarly, there exists the surplus sealing material 71" between the protrusion 51-2 and the protrusion 51-3, and the amount thereof is smaller than the amount of the sealing material 71 filled between the protrusion 51-1 and the protrusion 51-2.

In other words, the surplus sealing material 71' and the surplus sealing material 71" stay on the side of the first substrate 24 and normally do not reach the second substrate 27. The surplus sealing material 71 preferably does not exist or the amount thereof is preferably as small as possible, as it will be wasteful in terms of costs. Accordingly, it can be considered from the above that the amount of the surplus sealing material 71 is small and the surplus sealing material 71 does not reach an upper part of the protrusion 51-4 or the protrusion 51-3.

Accordingly, as it is not necessary that the protrusion 51-3 and the protrusion 51-4 respectively have the same height as the protrusion 51-1 and the protrusion 51-2, a structure shown in FIG. 9A can be applied. As shown in FIG. 9A, the protrusions 51-1 and 51-2 for securing the height of the sealing material 71 are the same in the case shown in FIG. 8A, however, the protrusion 51-4 provided on the left side of the protrusion 51-1 in the drawing and the protrusion 51-3 provided on the right side of the protrusion 51-2 in the drawing are formed to be lower in height than the protrusion 51-1 and the protrusion 51-2.

Even in the case where the protrusion 51-3 and the protrusion 51-4 provided for stopping the surplus sealing material 71 which is run off are lower in height than the protrusion 51-1 and the protrusion 51-2 as shown above, the surplus sealing material 71' and the surplus sealing material 71" do not climb over the protrusion 51-3 and the protrusion 51-4 as shown in FIG. 9B. Accordingly, the protrusion 51-3 and the protrusion 51-4 provided for preventing the surplus sealing material 71 which is run off from being further run off may be formed to be lower in height than other protrusions. When the protrusions are formed to be lower in height, an amount of the material for the protrusions 51 can be reduced, which leads to the reduction of costs as well as to the weight saving of products.

The heights of the protrusion 51-3 and the protrusion 51-4 may be the same as well as may be different from each other. For example, assume that the protrusion 51-4 is provided outside and the protrusion 51-3 is provided inside (the side of the liquid crystal material 23). In this case, if the sealing material 71 is run off to the side of the liquid crystal material 23 and touches the material, the performance of the liquid crystal lens panel 11 may be deteriorated. In order to prevent the situation, it is necessary that the protrusion 51-3 provided inside has a height in which the surplus sealing material 71 which is run off can be positively stopped.

In contrast to the protrusion 51-3, the protrusion 51-4 is provided outside, therefore, adverse effects to other parts are small even when the sealing material 71 is further run off from the protrusion 51-4 to the outside. Considering the above, the protrusion 51-4 may be formed to be lower in height than the protrusion 51-3. It is further possible to apply a structure in which the protrusion 51-4 is not provided. That is, it is possible to apply a structure in which the protrusion 51-1 and the protrusion 51-2 for securing the height of the sealing material 71 are provided and the protrusion 51-3 for preventing the sealing material 71 from being run off to the side of the liquid crystal material 23 is provided. In this case, the number of protrusions 51 is three.

It can be also considered that the sealing material 71 with an amount not to be run off is filled between the protrusion 51-1 and the protrusion 51-2 in advance for preventing the sealing material 71 from being run off. For example, assume that an amount of the sealing material 71 to be filled between the protrusion 51-1 and the protrusion 51-2 is reduced to be an amount in which the material appropriately stays between the protrusion 51-1 and the protrusion 51-2 as shown in FIG. 10A. A state in which the first substrate 24 and the second substrate 27 are superimposed in the above case is shown in FIG. 10B.

As shown in FIG. 10B, the sealing material 71 is pushed into between the protrusion 51-1 and the protrusion 51-2 when the second substrate 27 is superimposed on the first substrate 24, therefore, the sealing is performed. However, as the volume is not sufficient, a hole may occur. FIG. 10C is a view seen from the above. Though the sealing material 71 is filled between the protrusion 51-1 and the protrusion 51-2, the volume is not sufficient, therefore, a hole 91-1 and a hole 91-2 occur. When such holes 91 occur, the reliability of the seal part is reduced.

As it is not preferable to reduce the reliability of the seal part, it is preferable to provide a means for stopping a surplus sealing material 71 if it is run off, for example, as shown in FIG. 9A, so that the hole 91 does not occur in the sealing material 71 rather than applying the structure in which a small amount of the sealing material 71 is filled to prevent the run-off as shown FIG. 10A.

In the following description, the explanation will be continued on the assumption that a sufficient amount of the sealing material 71 is filled and the hole 91 does not occur.

Figure 11A:
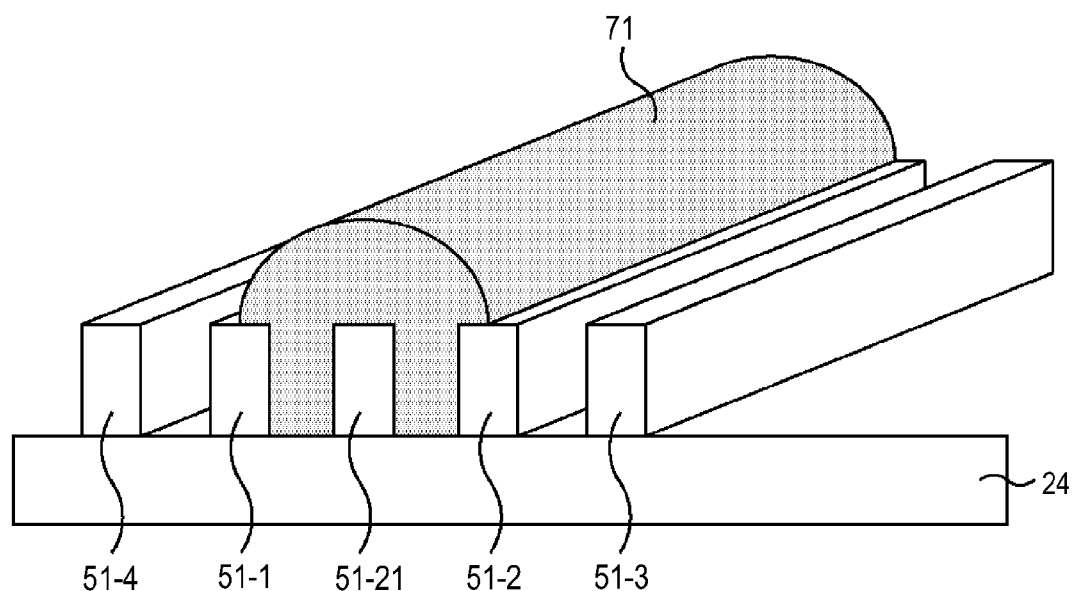
FIGS. 11A and 11B are views for explaining protrusions.
Figure 11B:
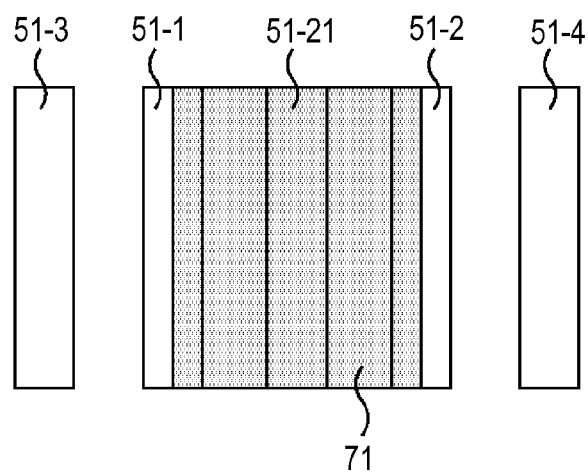

Another example of the case where the protrusions 51 for stopping the surplus sealing material 71 to be run off are provided shown in FIGS. 8A, 8B and FIGS. 9A, 9B will be shown in FIGS. 11A and 11B. FIG. 11A is a view seen from an oblique direction and FIG. 11B is a view seen from an upper direction. In the example shown in FIGS. 11A and 11B, five protrusions 51 are formed. Here, the explanation will be made on the assumption that further one protrusion 51 is added to the example shown in FIGS. 8A and 8B. As explained with reference to FIG. 8A, the protrusion 51-1 and the protrusion 51-2 are provided for securing the height of the sealing material 71 also in FIGS. 11A and 11B. The protrusion 51-3 and the protrusion 51-4 are provided for receiving the surplus sealing material 71 which is run off.

In the example shown in FIGS. 11A and 11B, a protrusion 51-21 is formed between the protrusion 51-1 and the protrusion 51-2. The protrusion 51-21 is a protrusion provided for reducing the amount of the sealing material 71. The protrusion 51-21 is the protrusion also provided for securing a gap (cell gap) between the first substrate 24 and the second substrate 27 and for increasing the strength. It is also possible to provide the protrusion 51 for securing the cell gap as described above. The explanation will be made on the assumption that the protrusion 51-21 is the protrusion as described above in FIGS. 11A and 11B, and plural protrusions having the feature described above can be provided.

FIGS. 12A and 12B show a structure in which the protrusion 51-4 and the protrusion 51-3 are not shown in the structure shown in FIGS. 11A and 11B. In the structure shown in FIGS. 12A and 12B, three protrusions 51-1, 51-2 and 51-21 are provided on the first substrate 24. Also in this case, the protrusion 51-21 is provided for securing the gap between the first substrate 24 and the second substrate 27. That is, the protrusion 51-21 is provided for controlling the height.

The protrusion 51-21 for controlling the height may be formed to be higher than the protrusion 51-1 and the protrusion 51-2 as shown in FIG. 12A. In other words, the height of the protrusion 51-21 for controlling the height between the substrates may be formed to be higher than the heights of the protrusion 51-1 and the protrusion 51-2 for controlling the interface of the sealing material 71.

As shown in FIG. 12B, when the first substrate 24 and the second substrate 27 are superimposed, the height is controlled by the protrusion 51-21. The height of the sealing material 71 is controlled by the protrusion 51-1 and the protrusion 51-2, thereby securing the sufficient height for allowing the sealing material 71 to touch the second substrate 27.

Also in the cases where the protrusions 51 are provided as shown in FIGS. 11A, 11B and FIGS. 12A, 12B, the line width can be easily controlled without occurrence of the hole 91.

Incidentally, each protrusion 51 is continuously formed when seen from the above as shown in FIG. 3. An enlarged partial structure is shown in FIG. 13A. When the sealing material 71 is filled between the protrusion 51-1 and the protrusion 51-2 which are continuously formed, the line width of the sealing material 71 can be formed as a uniform width as shown in FIG. 13B.

Figure 13C:
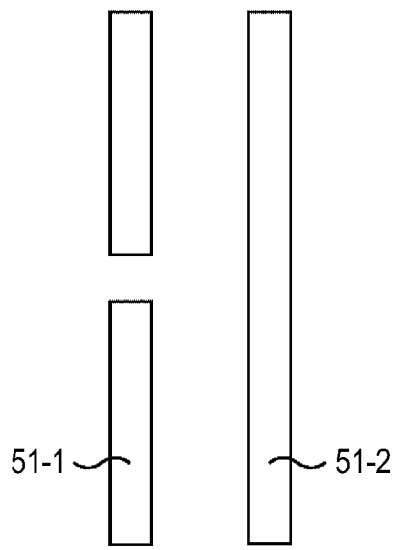
FIGS. 13A to 13D are views for explaining protrusions.
Figure 13A:
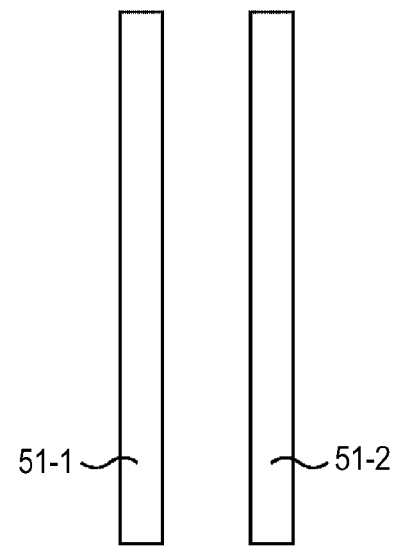
Figure 13D:
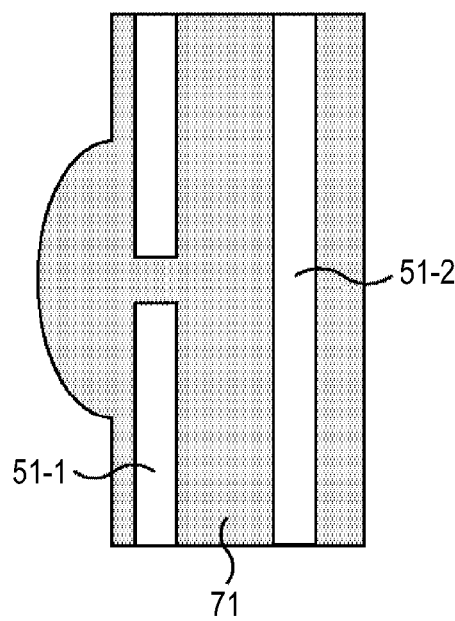
Figure 13B:
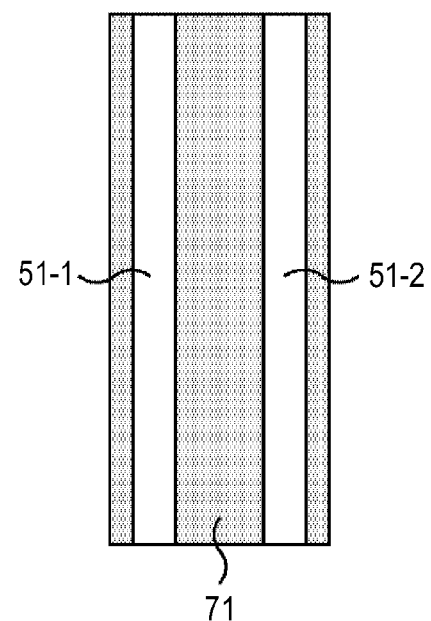

In a case where the protrusion 51-1 is discontinuously formed while the protrusion 51-2 is continuously formed as shown in FIG. 13C, a situation shown in FIG. 13D may happen when the sealing material 71 is filled.

Referring to FIG. 13D, the sealing material 71 is run off from a part of a cut as the protrusion 51-1 is discontinuously formed. When there is a cut and so on in the protrusion 51-1 as in this case, it may be difficult to uniform the line width of the sealing material 71, which may make the line width irregular. Accordingly, the protrusions 51 are preferably formed in the continuous manner.

However, it is preferable to open an inlet, referring to FIG. 3 again. When the inlet side is open, it is possible to reduce the probability of difficulty in filling liquid crystal which causes failures, therefore, reliability can be improved. Accordingly, the protrusions 51 can be continuously formed while the inlet side is open.

Figure 14:
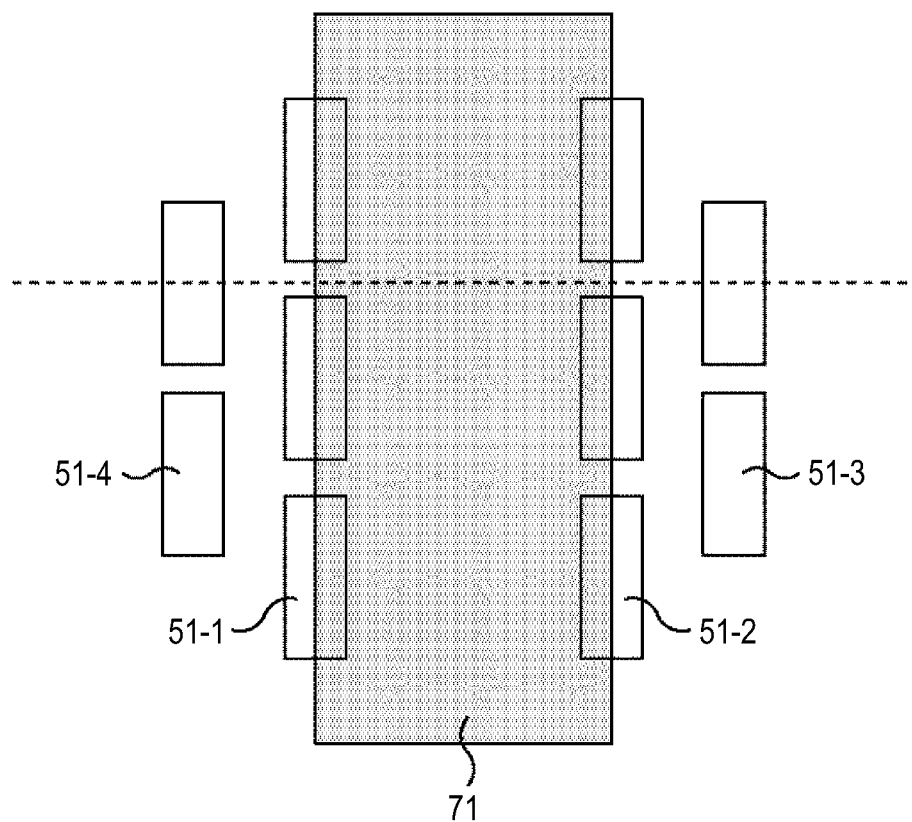
FIG. 14 is a view for explaining protrusions.

Even when the cut is formed in the protrusion 51, there is a probability that the sealing material 71 can be formed without making the line width irregular depending on the surface tension, a coating amount (filling amount) of the sealing material 71 and so on. In such case, the protrusions 51 may be discontinuously formed. FIG. 14 is a view showing a case where the protrusions 51 are discontinuously formed seen from the above.

FIG. 14 is a view showing a state in which the discontinuous protrusions 51 are arranged seen from the above, which is seen from the above. In the example shown in FIG. 14, the protrusions 51-1 to 51-4 are discontinuously formed. Cuts in the protrusion 51-1 and cuts in the protrusion 51-4 are alternately arranged, and cuts in the protrusion 51-2 and cuts in the protrusion 51-4 are also alternately arranged. In other words, the cuts in the protrusions 51-1 to 51-4 are arranged so as not to be aligned on a straight line.

In the example shown in FIG. 14, the sealing material 71 having the surface tension with a property not being run off from the cuts of the protrusions 51 is used. Alternatively, cuts are formed in the protrusions 51 when an amount of sealing material 71 to be filled is small enough not to be run off. Even when the sealing material 71 is run off from the cuts in the protrusion 51-1 and in the protrusion 51-2 sandwiching the sealing material 71, the sealing material 71 which has been run off can be stopped by the protrusion 51-3 and the protrusion 51-4 as the protrusion 51-3 or the protrusion 51-4 are provided.

In the case where cuts are formed in the protrusion 51-1 and the protrusion 51-2 as shown in FIG. 14, pressure applied to the sealing material 71 when the first substrate 24 and the second substrate 27 are superimposed can be released from the cut portions. It is also possible to reduce the material for the protrusions 51 by the cut portions, which can save weight.

Figure 15B:
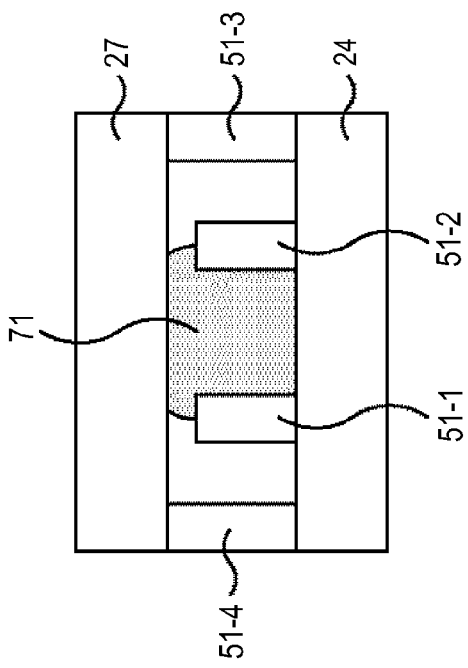
FIGS. 15A and 15B are views for explaining protrusions.
Figure 15A:
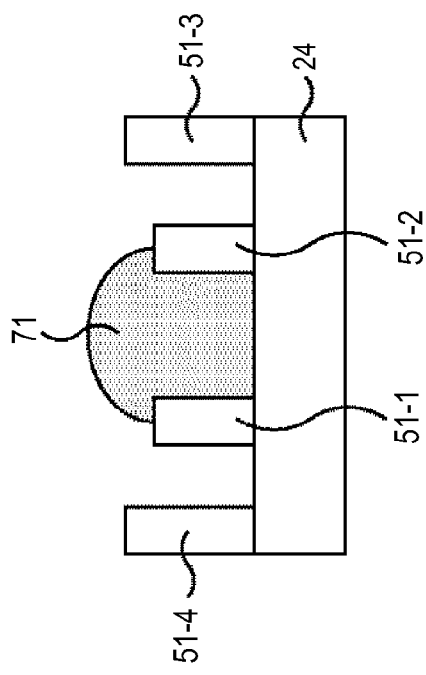

In an example shown in FIGS. 15A and 15B, the protrusions 51-1 to 51-4 are provided on the first substrate 24 in the same manner as the example shown in FIGS. 9A and 9B and other drawings. The protrusions 51-1 and 51-2 are respectively formed to be lower in height than the protrusions 51-3 and 51-4. When applying the structure shown in FIGS. 15A and 15B, the protrusion 51-1 and the protrusion 51-2 are provided for controlling the interface of the sealing material 71 and securing the height of the sealing material 71 in the same manner as in the cases described above.

The protrusion 51-3 and the protrusion 51-4 are provided for controlling the gap between the first substrate 24 and the second substrate 27. In this case, when the first substrate 24 and the second substrate 27 are superimposed, the gap between the substrates is equal to the height of the protrusion 51-4 and the protrusion 51-3 as shown in FIG. 15B, which means that the gap between the substrates is controlled by the protrusion 51-3 and the protrusion 51-4.

Also as shown in FIG. 15B, a portion swollen due to the surface tension of the sealing material 71 sandwiched by the protrusion 51-1 and the protrusion 51-2 is flattened by the second substrate 27. Accordingly, the first substrate 24 and the second substrate 27 are bonded together through the sealing material 71.

It is possible to control the sealing material 71 not to be run off to the outside of the protrusions 51-1 and 51-2 as shown in FIG. 15B. If it is run off, the run-off material is stopped by the protrusion 51-3 or the protrusion 51-4 provided for controlling the height, or an amount of the run-off material is small, which does not affect other portions.

Figure 16A:
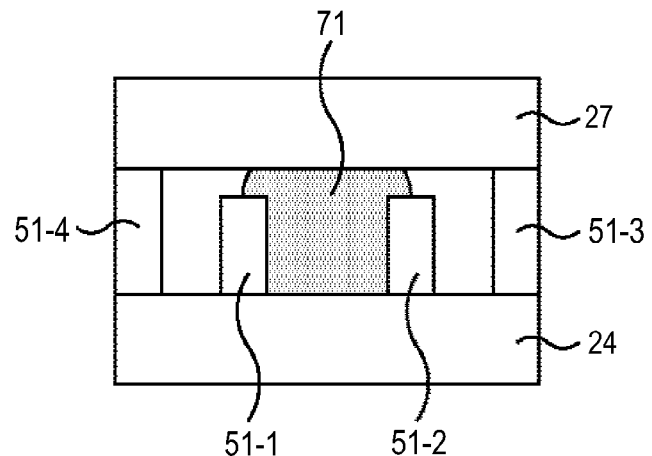
FIGS. 16A and 16B are views for explaining protrusions.
Figure 16B:
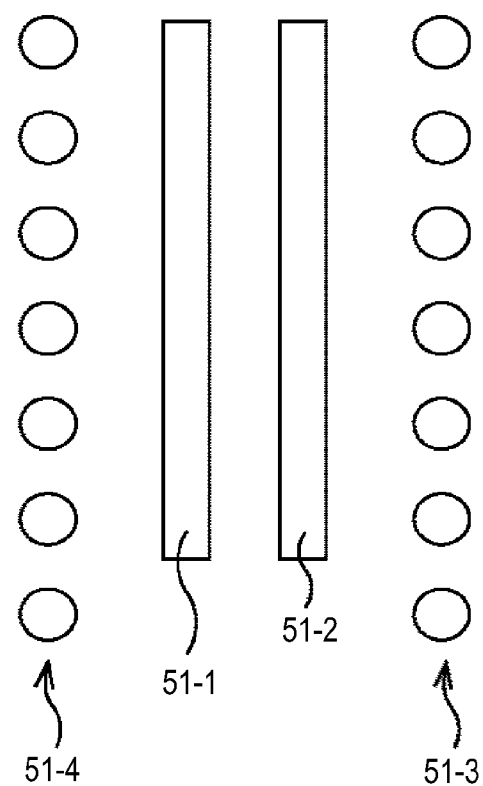

When applying the above structure, the protrusion 51-3 and the protrusion 51-4 provided outside may be formed in the discontinuous manner. Referring to FIGS. 16A and 16B, FIG. 16A is the same view as FIG. 15B. FIG. 16B is a view of the protrusions 51 seen from the above when the protrusions 51 are arranged as shown in FIG. 16A.

Though the protrusion 51-1 and the protrusion 51-2 sandwiching the sealing material 71 are continuously formed, the protrusion 51-4 and the protrusion 51-3 respectively have a structure in which plural protrusions having a columnar shape are aligned on a straight line. In this case, the protrusion 51-4 and the protrusion 51-3 are not provided for controlling the interface but for controlling the gap between the substrates, therefore, they can fulfill the role even when applying the discontinuous structure shown in FIG. 16B.

Figure 17A:
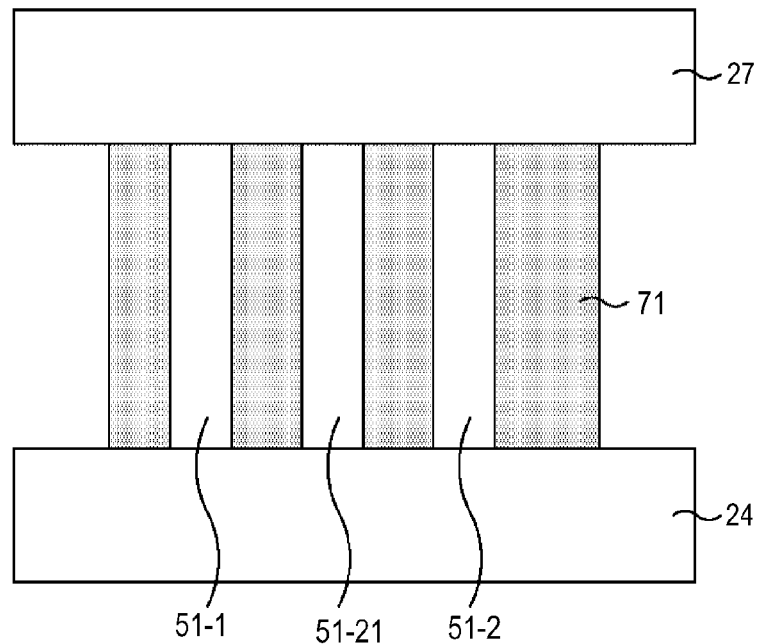
FIGS. 17A to 17C are views for explaining protrusions.
Figure 17B:
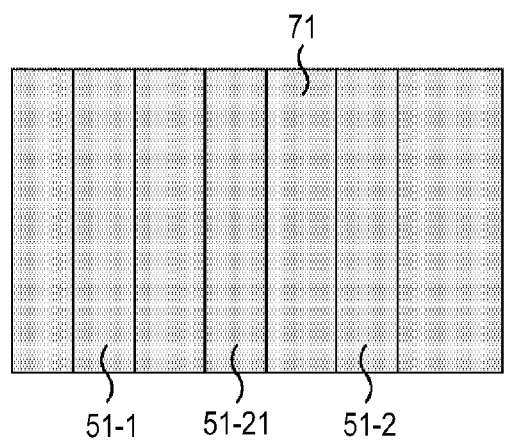
Figure 17C:
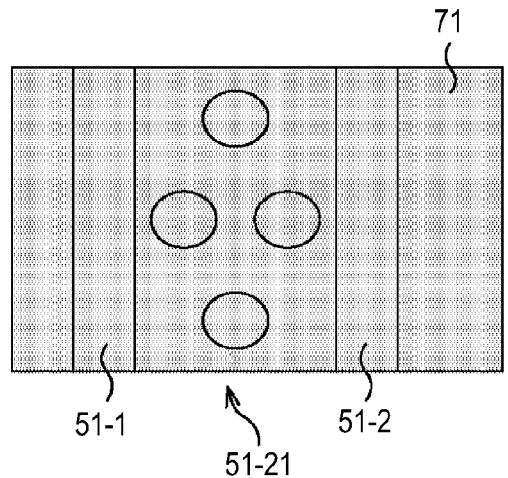

As described above, the protrusions 51 for controlling the height of the sealing material 71 (controlling the interface) are preferably formed in the continuous manner, and the protrusions 51 for controlling the gap between the substrates may be formed in the discontinuous manner. Accordingly, the protrusions 51 for controlling the gap between the substrates can be formed in the continuous manner as well as in the discontinuous manner, for example, even in the case shown in FIGS. 17A to 17C. FIGS. 17A to 17C will be referred to.

FIG. 17A is a view of the liquid crystal lens panel 11 seen from a lateral direction, and FIGS. 17B and 17C are views seen from an upper direction respectively. The structure shown in FIG. 17A is the example in which the protrusion 51-1, the protrusion 51-2 and the protrusion 51-21 are formed on the first substrate 24 in the same manner as the structure shown in FIG. 11A. Though the protrusion 51-3 and the protrusion 51-4 are not shown in the structure example shown in FIG. 17A, they can naturally be formed.

Among the protrusion 51-1, the protrusion 51-2 and the protrusion 51-21, the protrusion 51-1 and the protrusion 51-2 are provided for controlling the height direction (interface) of the sealing material 71, whereas the protrusion 51-21 is provided for controlling the gap between the first substrate 24 and the second substrate 27. Accordingly, the protrusion 51-1, the protrusion 51-2 and the protrusion 51-21 can be continuously formed respectively as shown in FIG. 17B.

As shown in FIG. 17C, among the protrusion 51-1, the protrusion 51-2 and the protrusion 51-21, the protrusion 51-21 provided for controlling the gap between the first substrate 24 and the second substrate 27 may be discontinuously formed. In the case where the protrusion 51-21 is discontinuously formed, respective protrusions may be formed in the columnar shape as shown in FIG. 17C. The respective protrusions may be naturally formed in a prismatic shape.

Additionally, respective protrusions formed in the columnar shape may be linearly arranged or may be arranged in a non-linear manner and so on, for example, in zigzags as shown in FIG. 17C. Though the protrusion 51-21 is provided for controlling the gap between the first substrate 24 and the second substrate 27, they can be provided for increasing the strength with respect to pressure from the above, and the zigzag arrangement is effective in such case.

It is also preferable that silica beads, glass rods and so on are mixed in the sealing material 71 to control the gap between the first substrate 24 and the second substrate 27. FIGS. 18A and 18B show an example of the liquid crystal lens panel 11 having a structure in which the height is controlled by silica beads. In the structure shown in FIGS. 18A and 18B, the protrusion 51-1 and the protrusion 51-2 are formed on the second substrate 27. The sealing material 71 is filled in the space between the protrusion 51-1 and the protrusion 51-2, and silica beads 101 is mixed in the sealing material 71.

The height of the first substrate 24 and the second substrate 27 in a thickness direction is controlled by the silica beads 101 mixed in the sealing material 71. It is possible to control the height of the first substrate 24 and the second substrate 27 in the thickness direction by using the silica beads 101 and so on as in this case. A portion represented as the effective pixel in the drawing is a portion where the liquid crystal material 23 of the liquid crystal lens panel 11 is arranged, which is the portion where the spacers 22 for controlling the height of the first substrate 24 and the second substrate 27 in the thickness direction are provided as explained with reference to FIG. 2.

The height of the liquid crystal lens panel 11 in the thickness direction can be controlled by making the spacers 22 by using the silica beads 101 so that the sizes of the silica beads 101 and the spacers 22 are the same.

The dispersed spacers and the silica beads are generally made of different materials. It is also possible to make the spacers 22 and the silica beads 101 by using different materials also in the present embodiment. As different properties are requested respectively for the silica beads 101 to be mixed in the sealing material 71 and the spacers 22 provided in the liquid crystal layer 21 for securing the gap between the substrates, it is preferable that materials or manufacturing methods suitable for the requested properties are applied.

For example, the spacers 22 are sometimes coated so as not to affect the alignment of liquid crystal. As the sealing material 71 of the seal part becomes rigid, positions of the silica beads 101 mixed in the sealing material 71 are fixed, however, the spacers 22 in the liquid crystal layer 21 (in the effective pixel part) are not fixed in the cell as they are, therefore, they are made of a sticking material so as not to move in the cell.

The silica beads 101 are mixed in the sealing material 71 as described above, and the spacers 22 are mixed in a solvent and dispersed to be provided in the effective pixel part. In the case where the spacers 22 are provided by being dispersed in the effective pixel part, a process of dispersion is included in manufacturing processes of the liquid crystal lens panel 11 (manufacture will be described later).

As described above, materials of the spacers 22 and the silica beads 101, manufacturing processes corresponding to materials can be changed in accordance with materials or manufacturing processes, to which the present disclosure can be applied.

It is also possible to use the silica beads for the spacers 22. When the silica beads is used for the spacers 22, the same material as the silica beads 101 to be mixed in the sealing material 71 can be used. In this case, the liquid crystal lens panel 11 is manufacturing by dispersing the silica beads 101 as the spacers 22 in the effective pixel part and by mixing the silica beads 101 in the sealing material 71.

The present embodiment can be configured such that the height between the substrates is controlled by the protrusions 51 and members for controlling the height such as spacers are not formed in the liquid crystal layer 21.

Also in the present embodiment, it is possible to perform control so that the height of the sealing material 71 can be obtained by the protrusions 51 and that the silica beads 101 are mixed in the sealing material 71, then, the height between the substrates can be controlled by the silica beads 101. In this case, members for controlling the height such as spacers are not formed in the liquid crystal layer 21.

It is also preferable that the spacers 22 are provided in the liquid crystal layer 21 and the spacers 22 are formed by the same material and in the same process as the protrusions 51. It is further preferable that the spacers 22 and the protrusions 51 are formed by different materials through processes of, for example, dispersion and so on to thereby form spacers 22.

As described above, in the present embodiment, the protrusions 51 and the dispersed spacers can be used by being combined with each other, the protrusions 51 and the silica beads can be used by being combined with each other, and further, only the protrusions 51 are used for controlling the height between the substrates of the liquid crystal lens panel 11.

A structure shown in FIG. 18B has basically the same structure as the structure of FIG. 18A, but differs from the structure of FIG. 18A in a point that the protrusion 51-1 and the protrusion 51-2 are formed on the first substrate 24 and differs in manufacturing processes. When the protrusion 51-1 and the protrusion 51-2 shown in FIG. 18B are formed so as to correspond to a process of manufacturing other layers included in the liquid crystal lens panel 11, the productivity is increased, and thus, the device can be manufactured without increasing the process. For example, when the liquid crystal panel 11 is manufactured by using photolithography, portions of the protrusions 51 can be manufactured only by changing a mask layout of the photolithography, therefore, the productivity is increased and the process is not increased. Accordingly, the present embodiment is advantageous in points of costs and yields.

For example, when wiring lines in two different layers intersect each other in the liquid crystal lens panel 11, there is a case that an organic insulating film is sandwiched between intersecting wiring lines (between layers) for insulation. In such case, an organic insulating layer 121 is provided in the effective pixel part with a given thickness. On the other hand, the organic insulating layer 121 is not formed in the portion where the sealing material 71 is filled (the organic insulating layer 121 is omitted under the seal) to thereby form the protrusion 51-1 and the protrusion 51-2. That is, the organic insulating layer 121 is manufactured by using a mask for obtaining a shape including the protrusion 51-1, the protrusion 51-2 and the organic insulating layer 121 as shown in FIG. 18B, thereby manufacturing the protrusion 51-1 and the protrusion 51-2 in the process of manufacturing the organic insulating layer 121.

Optical characteristics of the lens are determined by the thickness of the liquid crystal layer 21 of the effective pixel part, namely, the cell gap. The above manufacturing method enables the sealing gap to be wide when the cell gap is not changed. That is, the sealing material 71 is filled between the protrusion 51-1 and the protrusion 51-2 and preferably filled so as not to run off from the protrusion 51-1 or the protrusion 51-2, therefore, it is desirable that the accuracy in the coating amount by the dispenser and the like is high.

It can be considered that the coating amount is increased in order to improve the accuracy of the dispenser. As shown FIG. 18B, the organic insulating layer 121 is not provided in the portion where the protrusion 51-1 and the protrusion 51-2 are provided, that is, in the portion where the sealing material 71 is filled, therefore, the volume of the sealing material 71 can be increased accordingly. As the volume of the sealing material 71 can be increased, the accuracy of the dispenser can be improved, and thus, the sealing can be realized in a thinner line width as well as variation in accuracy of the line width can be suppressed.

In this case, the organic insulating layer 121 is cited as an example of a layer in a step direction, however, a multi-layer structure in which a layer in the cell, an electrode and so on are stacked may be applied.

As described above, a mechanism of controlling the height of the first substrate 24 and the second substrate 27 in the thickness direction in the portion of the sealing material 71 and a mechanism (spacers 22) of controlling the height of the first substrate 24 and the second substrate 27 in the thickness direction in the portion where the liquid crystal material 23 is arranged (effective pixel part) can be equivalently formed. This will be further explained with reference to FIGS. 19A and 19B.

FIG. 19A is a view showing the structure explained with reference to FIGS. 6A and 6B by including the portion of the liquid crystal material 23. In the structure shown in FIG. 19A, the spacers 22 are formed to have the same height as the protrusion 51-1 and the protrusion 51-2. That is, the height of the first substrate 24 and the second substrate 27 in the thickness direction is controlled by the spacers 22, the protrusions 51-1 and 51-2. The spacers 22, the protrusions 51-1 and 51-2 are formed in the same process and by the same material, thereby making the manufacture of the liquid crystal lens panel 11 easier.

FIG. 19B is a view showing the structure explained with reference to FIGS. 9A and 9B by including the portion of the liquid crystal material 23. Also in the structure shown in FIG. 19B, the spacers 22 are formed to have the same height as the protrusion 51-1 and the protrusion 51-2 in the same manner as FIG. 19A. That is, the height of the first substrate 24 and the second substrate 27 in the thickness direction is controlled by the spacers 22, the protrusions 51-1 and 51-2. The spacers 22, the protrusions 51-1 and 51-2 are formed in the same process and by the same material, thereby making the manufacture of the liquid crystal lens panel 11 easier.

FIG. 19B is also the view corresponding to FIGS. 12A and 12B. The protrusion 51-21 shown in FIGS. 12A and 12B is provided for controlling the height of the liquid crystal panel 11 in the thickness direction. The protrusion 51-1 and the protrusion 51-2 in FIG. 19B correspond to the protrusion 51-21 in FIGS. 12A and 12B. That is, as the protrusion 51-1 and the protrusion 51-2 are provided for controlling the height of the liquid crystal lens panel 11 in the thickness direction, the protrusion 51-1 and the protrusion 51-2 are formed to have the same height as the spacers 22 which are also provided for controlling the height of the liquid crystal lens panel 11 in the thickness direction.

The spacers 22, the protrusions 51-1 and 51-2 controlling the height of the liquid crystal lens panel 11 in the thickness direction are formed in the same process and by the same material, thereby making the manufacture of the liquid crystal lens panel 11 easier.

It is also possible to form the spacers 22, the protrusions 51-1 and 51-2 as different members in different layers.

[Manufacture of Liquid Crystal Lens Panel 11]

Figure 20:
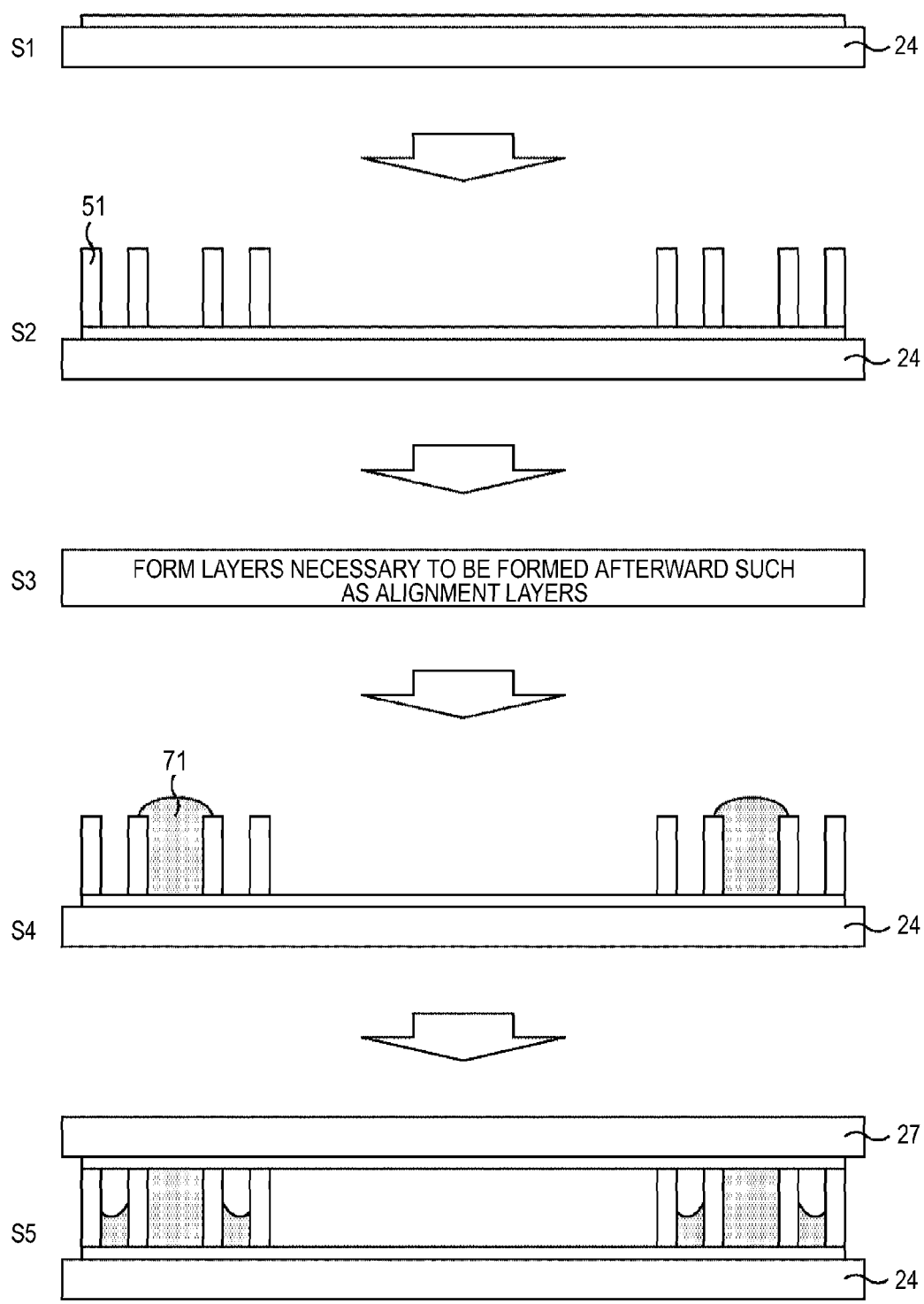
FIG. 20 is a view for explaining formation of protrusions.

Next, manufacture of the liquid crystal lens panel 11 will be explained. The protrusions 51 are provided in the periphery of the liquid crystal lens panel 11 as described above. The manufacture relating to the protrusions 51 will be explained with reference to FIG. 20.

In a process S1, first, a base layer is generated. When the liquid crystal lens panel 11 having the structure shown in FIG. 2 is manufactured, for example, a transparent conductive film such as a ITO (Indium Tin Oxide) film is formed with a given pattern as the base layer on the first substrate 24 and the second substrate 27 made of a glass material respectively, in which the first electrode group 26 and the second electrode group 29 are formed. The alignment films 25 and 28 are formed by using a rubbing method in which a high polymer compound such as polyamide is rubbed in one direction by cloth, an oblique evaporation method such as SiO and the like. According to the films, long axes of the liquid crystal material 23 can be aligned in one direction.

As a process S2, the protrusions 51 are formed. The spacers 22 (not shown in FIG. 20) made of a glass material or a resin material are arranged in a dispersed manner on the alignment films 25 and 28 for keeping the gap between the first substrate 24 and the second substrate 27 to be uniform.

As explained with reference to FIGS. 18A, 18B and so on, when the protrusions 51 and the spacers 22 are formed by different materials and the spacers 22 are arranged, for example, in the dispersed manner by dispersion, a process of dispersing the spacers 22 is provided before or after the process S2 in which the protrusions 51 are formed.

It is also possible to form the protrusions 51 and the spacers 22 by the same material and in the same process as explained with reference to FIGS. 18A, 18B and so on. When the protrusions 51 and the spacers 22 are formed by the same material and in the same process, they can be formed by photolithography using acrylic photoresist and the like. When the protrusions 51 and the spacers 22 are formed in the same process, the process of dispersing spacers can be omitted and the number of processes can be reduced. The protrusions 51 and the spacers 22 can be made of plastics.

As described above, the protrusions 51 can be formed by applying the photolithography as a micropattern fabrication technology using a photofinishing technology. As the height of the protrusions 51 is relatively higher in the case of the liquid crystal lens panel 11, the film thickness can be increased and the film can be formed by applying a slit coater.

It is also possible to apply spin coating or a combination of spin coating and slit coating, however, a method not using the spin coating is preferable. It is also preferable to use film resist and so on.

The protrusions 51 can be made of plastics using a method of metallic molding such as an imprint technique or a sand-blasting method. In this case, the layer corresponding to the base layer such as the alignment layer 25 is formed as a process S3 after the protrusions 51 are formed as the process S2.

In order to form the spacers 22 with a high aspect ratio in the imprint technique or the like, it may be difficult to form the spacers 22 unless a resin material remains on the substrate. Considering the above, it is also preferable that the electrode structure is formed after forming the spacers 22 in the effective pixel part and the protrusions 51 in the seal part. Also in the case of applying the order of processes, the spacers 22 can be made by the method of dispersing silica beads or plastics.

As a process of S4, the sealing material 71 is coated by the dispenser or by printing. As described above, the sealing material 71 is coated on places of the protrusions 51 provided for controlling the interface of the sealing material 71 in the protrusions 51. Then, as a process of S5, the first substrate 24 and the second substrate 27 are bonded together and the sealing material 71 becomes rigid.

In the case where the protrusions 51 are formed with the inlet as shown in FIG. 3, the liquid crystal material 23 is injected between the first substrate 24 and the second substrate 27 from the inlet, then, the inlet of the sealing material 71 is sealed. Then, liquid crystal components are heated to be an isotropic phase and slowly cooled, thereby manufacturing the liquid crystal lens panel 11.

When the liquid crystal material 23 is filled by using a liquid crystal one-drop-fill (ODF) process, the liquid crystal material 23 is dropped after the process S4, then, the first substrate 24 and the second substrate 27 are bonded together in the process S5.

As the liquid crystal panel 11 is manufactured as described above, the protrusions 51 can be manufactured in the manufacturing process thereof, and the spacers 22 can be formed at the same time as the spacers 22 and so on, therefore, the protrusions 51 can be formed without increasing the number of processes.

The substrates can be sealed by forming the protrusions 51 on any one of the first substrate 24 and the second substrate 27 and only by bonding the other substrate, and further, the occurrence of holes in the sealing material 71 can be prevented as described above, therefore, the sealing with high reliability can be provided as well as the liquid crystal lens panel 11 can be manufactured easily.

In the above embodiment, the liquid crystal lens panel 11 has been explained as the example. The reason why the liquid crystal lens panel 11 has been explained as the example is that the height of the first substrate 24 and the second substrate 27 in the thickness direction is necessary to be higher than the LCD 13 and so on. However, the application of the present disclosure is not limited to optical devices such as the liquid crystal lens panel 11. For example, the present disclosure can be applied to a case where two substrates are superimposed so as to sandwich the sealing material regardless of the type of substrates. Accordingly, the present disclosure can be applied to, for example, the LCD 13 and can be applied to the seal part of the LCD 13.

Though the liquid crystal lens panel 11 has been explained as the example in the above embodiment, the present disclosure can be also applied to sealing other than the sealing of liquid crystal in the liquid crystal lens and so on. That is, the present disclosure can be applied to a case of sealing liquid. Particularly, it is effective to apply the present disclosure when the substrates are sealed in a state where a wider gap is obtained between substrates. It is also particularly effective when the line width of the sealing should be reduced.

Though the liquid crystal lens panel 11 has been explained as the example in the above embodiment, it is possible to apply the present disclosure to optical devices other than the optical device of the liquid crystal, for example, a liquid lens.

The optical device to which the present disclosure is applied may be used as the optical device for 3D display which polarizes display image light from the 2D display device in plural viewing angle directions on a screen of the 2D display device such as the liquid crystal display. The present disclosure can be also applied to a display device configured by sealing a given type of liquid such as the liquid crystal display.

The optical device to which the present disclosure is applied can be also applied to, for example, electronic apparatuses including display devices such as a television receiver, a smart phone, a cellular phone device, a portable game machine and a Netbook computer.

The embodiment of the present disclosure is not limited to the above embodiment and can be variously changed within a range not departing from the gist of the present disclosure.

The present disclosure can be implemented as the following configurations.

(1) An optical device including
at least two protrusions on a first substrate,
a sealing material filled between the two protrusions,
a second substrate attached so as to face and touch the first substrate through the sealing material, and
a liquid crystal material injected between the first substrate and second substrate.

(2) The optical device described in the above (1),
in which the protrusions are provided for controlling an interface of the sealing material and provided for allowing the sealing material to secure a height between the first substrate and the second substrate.

(3) The optical device described in the above (1) or (2), further including
a protrusion for stopping the sealing material which is run off from the protrusion formed outside any one of the two protrusions.

(4) The optical device described in the above (3),
in which the protrusion for stopping the sealing material is provided to be lower in height than the two protrusions.

(5) The optical device described in any of the above (1) to (4),
in which the two protrusions have a height necessary for a gap between the first substrate and the second substrate.

(6) The optical device described in any of the above (1) to (5), further including
a protrusion having the height necessary for the gap between the first substrate and the second substrate.

(7) The optical device described in any of the above (1) to (6),
in which dispersed spacers are included in the liquid crystal material.

(8) The optical device described in any of the above (1) to (6),
in which silica beads are included in the sealing material, and
the silica beads or the dispersed spacers are included in the liquid crystal material.

(9) The optical device described in any of the above (1) to (8),
in which spacers provided between the first substrate and the second substrate in a portion where the liquid crystal material is injected and the protrusions are made of the same material.

(10) A display device including
a display part performing image display, and
a lens part arranged so as to face a display surface of the display part, selectively changing a transmission state of light rays from the display part,
in which the lens part has
at least two protrusions on a first substrate,
a sealing material filled between the two protrusions,
a second substrate attached so as to face and touch the first substrate through the sealing material, and
a liquid crystal material injected between the first substrate and second substrate.

(11) An electronic apparatus including
a display part performing image display, and
a lens part arranged so as to face a display surface of the display part, selectively changing a transmission state of light rays from the display part,
in which the lens part has
at least two protrusions on a first substrate, and
a sealing material filled between the two protrusions,
second substrate attached so as to face and touch the first substrate through the sealing material, and
a liquid crystal material injected between the first substrate and second substrate.

(12) A manufacturing device of a liquid crystal lens panel having a liquid crystal material by the processing including
forming two protrusions on a first substrate,
filling a sealing material between the two protrusions,
stacking the second substrate so as to face and touch the first substrate through the sealing material, and
injecting the liquid crystal material between the stacked first substrate and the second substrate.

(13) The manufacturing device described in the above (12),
in which the protrusions are formed so as to control an interface of the sealing material and to allow the sealing material to secure a height between the first substrate and the second substrate.

(14) The manufacturing device described in the above (12), in which the processing further includes
forming a protrusion for stopping the sealing material which is run off from the protrusion outside any one of the two protrusions.

(15) The manufacturing device described in any of the above (12) to (14), wherein the processing further includes
dispersing dispersed spacers on the first substrate.

(16) The manufacturing device described in any of the above (12) to (14),
in which spacers provided between the first substrate and the second substrate in a portion where the liquid crystal material is injected and the protrusions are made of the same material and
the spacers and the protrusions are formed on the first substrate in the same process.

(17) A manufacturing method of a liquid crystal lens panel having a liquid crystal material, including
forming at least two protrusions on a first substrate,
filling a sealing material between the two protrusions,
attaching the second substrate so as to face and touch the first substrate through the sealing material, and
injecting the liquid crystal material between the first substrate and the second substrate.

The present disclosure contains subject matter related to that disclosed in Japanese Priority Patent Application JP 2012-038433 filed in the Japan Patent Office on Feb. 24, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical device comprising:
   at least two first protrusions on a first substrate;
   a sealing material that fills an internal space between the first protrusions;
   a second substrate positioned on the first substrate;
   a liquid crystal material between the first substrate and the second substrate; and
   at least one second protrusion on the first substrate and disposed external to the internal space of the first protrusions, wherein
      a portion of the sealing material that has overflowed from the internal space between the first protrusions is disposed between at least one of the first protrusions and at least one second protrusion.

2. The optical device according to claim 1, wherein the protrusions are provided for controlling an interface of the sealing material and provided for allowing the sealing material to secure a height between the first substrate and the second substrate.

3. The optical device according to claim 1, wherein the second protrusion is lower in height than the first protrusions.

4. The optical device according to claim 1, wherein the first protrusions have a height necessary for a gap between the first substrate and the second substrate.

5. The optical device according to claim 1, wherein the second protrusion has the height necessary for the gap between the first substrate and the second substrate.

6. The optical device according to claim 1, wherein dispersed spacers are included in the liquid crystal material.

7. The optical device according to claim 1, wherein spacers provided between the first substrate and the second substrate in a portion where the liquid crystal material is injected and the first and second protrusions are made of the same material.

8. An optical device comprising:
   at least two first protrusions on a first substrate;
   a sealing material that fills an internal space between the first protrusions;
   a second substrate positioned on the first substrate; and
   a liquid crystal material between the first substrate and the second substrate,
   wherein
      silica beads are included in the sealing material, and
      the silica beads or the dispersed spacers are included in the liquid crystal material.

9. A display device comprising:
   a display part performing image display; and
   a lens part arranged so as to face a display surface of the display part, selectively changing a transmission state of light rays from the display part,
   the lens part having:
      at least two first protrusions on a first substrate;
      a sealing material that fills an internal space between the first protrusions;
      a second substrate positioned on the first substrate;
      a liquid crystal material between the first substrate and the second substrate; and
      at least one second protrusion on the first substrate and disposed external to the internal space of the first protrusions, wherein
         a portion of the sealing material that has overflowed from the internal space between the first protrusions is disposed between at least one of the first protrusions and at least one second protrusion.

10. An electronic apparatus comprising:
    a display part performing image display; and
    a lens part arranged so as to face a display surface of the display part, selectively changing a transmission state of light rays from the display part,
    the lens part having:
       at least two first protrusions on a first substrate;
       a sealing material that fills an internal space between the first protrusions;
       a second substrate positioned on the first substrate;
       a liquid crystal material between the first substrate and the second substrate; and
       at least one second protrusion on the first substrate and disposed external to the internal space of the first protrusions, wherein
          a portion of the sealing material that has overflowed from the internal space between the first protrusions is disposed between at least one of the first protrusions and the at least one second protrusion.

11. A manufacturing device of a liquid crystal lens panel including a liquid crystal material by the processing including:
    forming at least two first protrusions on a first substrate;
    filling an internal space between the first two protrusions by sealing material,
    forming a second protrusion positioned on the first substrate, external to the internal space of the first protrusions;
    positioning the second substrate on the first substrate; and
    disposing a portion of the sealing material that has overflowed from the internal space between the first protrusions to between the first protrusions and at least one second protrusion; and
    the liquid crystal material between the stacked first substrate and the second substrate.

12. The manufacturing device according to claim 11, wherein the first protrusions are formed so as to control an interface of the sealing material and to allow the sealing material to secure a height between the first substrate and the second substrate.

13. The manufacturing device according to claim 11, wherein the processing further includes dispersing dispersed spacers on the first substrate.

14. The manufacturing device according to claim 11, wherein
    spacers provided between the first substrate and the second substrate in a portion where the liquid crystal material is injected and the first and second protrusions are made of the same material, and
    the spacers and the first and second protrusions are formed on the first substrate in the same process.

15. The manufacturing device according to claim 11, wherein
    the sealing material fills between the first protrusions such that substantially convex shape of the sealing material is higher than the first protrusions and stable due to surface tension, and then
    the sealing material higher than the first protrusions is caused to overflow from the first protrusions and is disposed between the first protrusion and the second protrusion that directly oppose each other.

16. A manufacturing method of a liquid crystal lens panel including a liquid crystal material, comprising:

forming at least two first protrusions on a first substrate;

filling an internal space between the first two protrusions by sealing material, forming a second protrusion positioned on the first substrate, external to the internal space of the first protrusions;

positioning the second substrate on the first substrate;

disposing a portion of the sealing material that has overflowed from the internal space between the first protrusions to between the first protrusions and at least one second protrusion; and the liquid crystal material between the stacked first substrate and the second substrate.

17. The manufacturing method according to claim 16, wherein the sealing material fills between the first protrusions such that substantially convex shape of the sealing material is higher than the first protrusions and stable due to surface tension, and the sealing material higher than the first protrusions is caused to overflow from the first protrusions and is disposed between the first protrusion and the second protrusion that directly oppose each other.

* * * * *